(12) United States Patent
Schenken

(10) Patent No.: US 9,195,950 B2
(45) Date of Patent: Nov. 24, 2015

(54) SYSTEMS AND METHODS FOR DEFINING ATTRIBUTES OF ATTENDED DELIVERY/PICKUP LOCATIONS

(71) Applicant: United Parcel Service of America, Inc., Atlanta, GA (US)

(72) Inventor: Christopher Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 14/201,241

(22) Filed: Mar. 7, 2014

(65) Prior Publication Data

US 2014/0278099 A1  Sep. 18, 2014

Related U.S. Application Data

(60) Provisional application No. 61/791,008, filed on Mar. 15, 2013, provisional application No. 61/777,968, filed on Mar. 12, 2013.

(51) Int. Cl.
*G01C 21/34* (2006.01)
*G06Q 10/02* (2012.01)
(Continued)

(52) U.S. Cl.
CPC .......... *G06Q 10/02* (2013.01); *G06Q 10/06312* (2013.01); *G06Q 10/083* (2013.01);
(Continued)

(58) Field of Classification Search
CPC . G06Q 10/02; G06Q 10/0836; G06Q 10/087; G06Q 10/06312; G06Q 10/0833; G06Q 30/0207; G06Q 10/0837; G06Q 30/0233; G06Q 10/083; G06Q 10/0835; G06Q 50/28; G06Q 10/08355; G06Q 10/08345

USPC ......................................................... 701/533
See application file for complete search history.

(56) References Cited

U.S. PATENT DOCUMENTS 7,962,422 B1  6/2011  Melechko et al.
2002/0143670 A1*  10/2002  Cushing et al. ................. 705/28
(Continued)

FOREIGN PATENT DOCUMENTS

EP  2469291 A1  6/2012
WO  2010123611 A1  10/2010

OTHER PUBLICATIONS

SEP leads €26 million funding round for Kiala, http://www.sep.co.uk/news/story/sep-leads-e26-million-funding-round-for-kiala-2/, Nov. 30, 2007, SEP Scottish Equity Partners.
(Continued)

*Primary Examiner* — Mary Cheung
*Assistant Examiner* — Brian P Sweeney
(74) *Attorney, Agent, or Firm* — Brient Globerman, LLC

(57) ABSTRACT

A computer system for defining attributes associated with attended delivery/pickup locations is described. In various embodiments, the system is configured to enable an authorized user (e.g., a manager of an attended delivery/pickup location) to define certain attributes of a particular attended delivery/pickup location. In some embodiments, the system is configured to verify that the particular user is authorized to define the one or more attributes associated with the particular attended delivery/pickup location (e.g., by checking a list of one or more authorized users). The attributes may be: 1) one or more times the particular attended delivery/pickup location is open for individuals to pick up a parcel; and 2) a certain product and/or brand the particular attended delivery location will accept. Once the one or more attributes are defined, in one or more embodiments, the system is configured to accept or reject parcel delivery requests based at least in part on the attributes.

28 Claims, 6 Drawing Sheets

(51) Int. Cl.
*G06Q 10/08* (2012.01)
*G06Q 10/06* (2012.01)
*G06Q 30/02* (2012.01)
*G06Q 50/28* (2012.01)

(52) U.S. Cl.
CPC .......... *G06Q10/087* (2013.01); *G06Q 10/0833* (2013.01); *G06Q 10/0835* (2013.01); *G06Q 10/0836* (2013.01); *G06Q 10/0837* (2013.01); *G06Q 10/08345* (2013.01); *G06Q 10/08355* (2013.01); *G06Q 30/0207* (2013.01); *G06Q 30/0233* (2013.01); *G06Q 50/28* (2013.01)

(56) References Cited

U.S. PATENT DOCUMENTS

| | | | |
|---|---|---|---|
| 2002/0156645 | A1* | 10/2002 | Hansen ............................. 705/1 |
| 2002/0165729 | A1 | 11/2002 | Kuebert et al. |
| 2004/0215480 | A1 | 10/2004 | Kadaba |
| 2005/0004877 | A1 | 1/2005 | McLellan et al. |
| 2007/0005452 | A1 | 1/2007 | Klingenberg et al. |
| 2009/0106124 | A1 | 4/2009 | Yang |
| 2009/0259509 | A1 | 10/2009 | Landvater |
| 2010/0012769 | A1 | 1/2010 | Alber et al. |
| 2010/0138281 | A1 | 6/2010 | Zhang et al. |
| 2011/0084162 | A1 | 4/2011 | Goossen et al. |
| 2012/0047084 | A1 | 2/2012 | Naghshineh et al. |
| 2013/0054054 | A1 | 2/2013 | Tollenaere et al. |

OTHER PUBLICATIONS

Related Case—U.S. Appl. No. 14/170,298, filed Jan. 31, 2014, entitled Systems and Methods for Parcel Delivery to Alternate Delivery Locations.
Related Case—U.S. Appl. No. 14/199,787, filed Mar. 6, 2014, entitled Systems and Methods of Delivering Parcels using Attended Delivery/Pickup Locations.
Related Case—U.S. Appl. No. 14/199,830, filed Mar. 6, 2014, entitled Systems and Methods of Suggesting Attended Delivery/Pickup Locations.
Related Case—U.S. Appl. No. 14/200,267, filed Mar. 7, 2014, entitled Systems and Methods of Reserving Space Attended Delivery/Pickup Locations.
Related Case—U.S. Appl. No. 14/200,301, filed Mar. 7, 2014, entitled Systems and Methods of Managing the Capacity of Attended Delivery/Pickup Locations.
Related Case—U.S. Appl. No. 14/200,432, filed Mar. 7, 2014, entitled Systems and Methods of Re-Routing Parcels Intended for Delivery to Attended Delivery/Pickup Locations.
Related Case—U.S. Appl. No. 14/200,328, filed Mar. 7, 2014, entitled Systems and Methods of Flexibly Activating Temporary Attended Delivery/Pickup Locations.
Related Case—U.S. Appl. No. 14/200,528, filed Mar. 7, 2014, entitled Systems and Methods of Managing Item Pickup at Attended Delivery/Pickup Locations.
Related Case—U.S. Appl. No. 14/200,681, filed Mar. 7, 2014, entitled Systems and Methods of Managing Signatures of Documents.
Related Case—U.S. Appl. No. 14/200,724, filed Mar. 7, 2014, entitled Systems and Methods for Returning Items to Attended Delivery/Pickup Locations.
Related Case—U.S. Appl. No. 14/201,029, filed Mar. 7, 2014, entitled Systems and Methods of Managing Item Pickup at Attended Delivery/Pickup Locations.
Related Case—U.S. Appl. No. 14/201,114, filed Mar. 7, 2014, entitled Systems and Methods of Locating and Selling Items at Attended Delivery/Pickup Locations.
Related Case—U.S. Appl. No. 14/201,306, filed Mar. 7, 2014, entitled Systems and Methods for Determining Charges Related to the Delivery of a Parcel.
Related Case—U.S. Appl. No. 14/201,354, filed Mar. 7, 2014, entitled Systems and Methods for Ranking Potential Attended Delivery/Pickup Locations.
PCT International Search Report, dated Nov. 25, 2014, from corresponding International Application Serial No. PCT/US2014/023575.
Written Opinion of the International Searching Authority, dated Nov. 25, 2014, from corresponding International Application Serial No. PCT/US2014/023575.
PCT International Search Report, dated Nov. 25, 2014, from corresponding International Application Serial No. PCT/US2014/023665.
Written Opinion of the International Searching Authority, dated Nov. 25, 2014, from corresponding International Application Serial No. PCT/US2014/023665.
PCT International Search Report, dated Dec. 4, 2014, from corresponding International Application Serial No. PCT/US2014/023638.
Written Opinion of the International Searching Authority, dated Dec. 4, 2014, from corresponding International Application Serial No. PCT/US2014/023638.
PCT International Search Report, dated Nov. 17, 2014, from corresponding International Application Serial No. PCT/US2014/014280.
Written Opinion of the International Searching Authority, dated Nov. 17, 2014, from corresponding International Application Serial No. PCT/US2014/014280.

* cited by examiner

SYSTEMS AND METHODS FOR DEFINING ATTRIBUTES OF ATTENDED DELIVERY/PICKUP LOCATIONS

CLAIM OF PRIORITY

This application claims the benefit of U.S. Provisional Patent Application No. 61/791,008, filed Mar. 15, 2013, entitled, "Systems and Methods of Delivering Parcels Using Attended Delivery Locations," and U.S. Provisional Patent Application No. 61/777,968, filed Mar. 12, 2013, entitled "Systems and Methods of Delivering Parcels Using Attended Delivery Locations," both of which are incorporated herein by reference in their entirety.

BACKGROUND

An increase in Internet commerce has led to an increase in the number of parcels delivered to individuals. It may be convenient for individuals to have parcels delivered to a location other than their home or office due to, for example, signature requirements for certain parcels.

Various embodiments of the present systems and methods recognize and address the foregoing considerations, and others, of prior art systems and methods.

SUMMARY

In general, in various embodiments, a computer system includes at least one processor and is configured for: 1) receiving a list of one or more authorized users, wherein the one or more authorized users are one or more users that are authorized to define a plurality of attributes associated with a particular attended delivery/pickup location; 2) storing, in memory, the list of one or more authorized users; 3) receiving a request from a particular user to define at least one attribute of the plurality of attributes associated with the particular attended delivery/pickup location; 4) determining whether the particular user is on the list of one or more authorized users; 5) at least partially in response to determining that the particular user is on the list of one or more authorized users, enabling the particular user to define the at least one attribute associated with the particular attended delivery/pickup location; 6) storing the defined at least one attribute in memory; 7) receiving a delivery request to facilitate delivery of at least one parcel to the particular attended delivery/pickup location, the delivery request including at least one characteristic associated with the delivery of the at least one parcel.

In particular embodiments, the computer system is further configured for: 1) determining whether the particular attended delivery/pickup location will receive the at least one parcel based at least in part on: a) the at least one attribute associated with the particular attended delivery/pickup location; and b) the at least one characteristic associated with the delivery of the at least one parcel. In one or more embodiments, the computer system is further configured for, based at least in part on determining the particular attended delivery/pickup location will receive the at least one parcel, facilitating delivery of the at least one parcel to the particular attended delivery/pickup location.

It should be understood, in light of this disclosure, that the above steps may also be completed by, in various embodiments, a computer-implemented method, by at least one processor, and/or a non-transitory computer-readable medium storing computer readable instructions.

BRIEF DESCRIPTION OF THE DRAWINGS

Various embodiments of a system and method for delivering parcels to attended delivery/pickup locations are described below. In the course of this description, reference will be made to the accompanying drawings, which are not necessarily drawn to scale, and wherein.

DETAILED DESCRIPTION

Various embodiments now will be described more fully hereinafter with reference to the accompanying drawings. It should be understood that the invention may be embodied in many different forms and should not be construed as limited to the embodiments set forth herein. Like numbers refer to like elements throughout.

Overview

Logistics networks, according to various embodiments, use attended pickup and delivery locations to facilitate: (1) the convenient delivery of parcels and other items to individuals; and/or (2) the convenient pickup of parcels and other items from individuals who wish to send those items to others via a common carrier. In various embodiments, existing retail businesses may be used as suitable delivery/pickup locations. For example, a gas station, a convenience store, a flower shop, a magazine stand, a retail location associated with a common carrier, a kiosk at a mall, or a retail department store may enter into an agreement with a common carrier to accept deliveries of parcels (and/or other items) that are to be picked up later, at a convenient time, by the intended recipient of the parcels or other items. The retail location may also agree to serve as a drop-off point for parcels and/or other items that are to be delivered to another location by the carrier.

Figure 1:
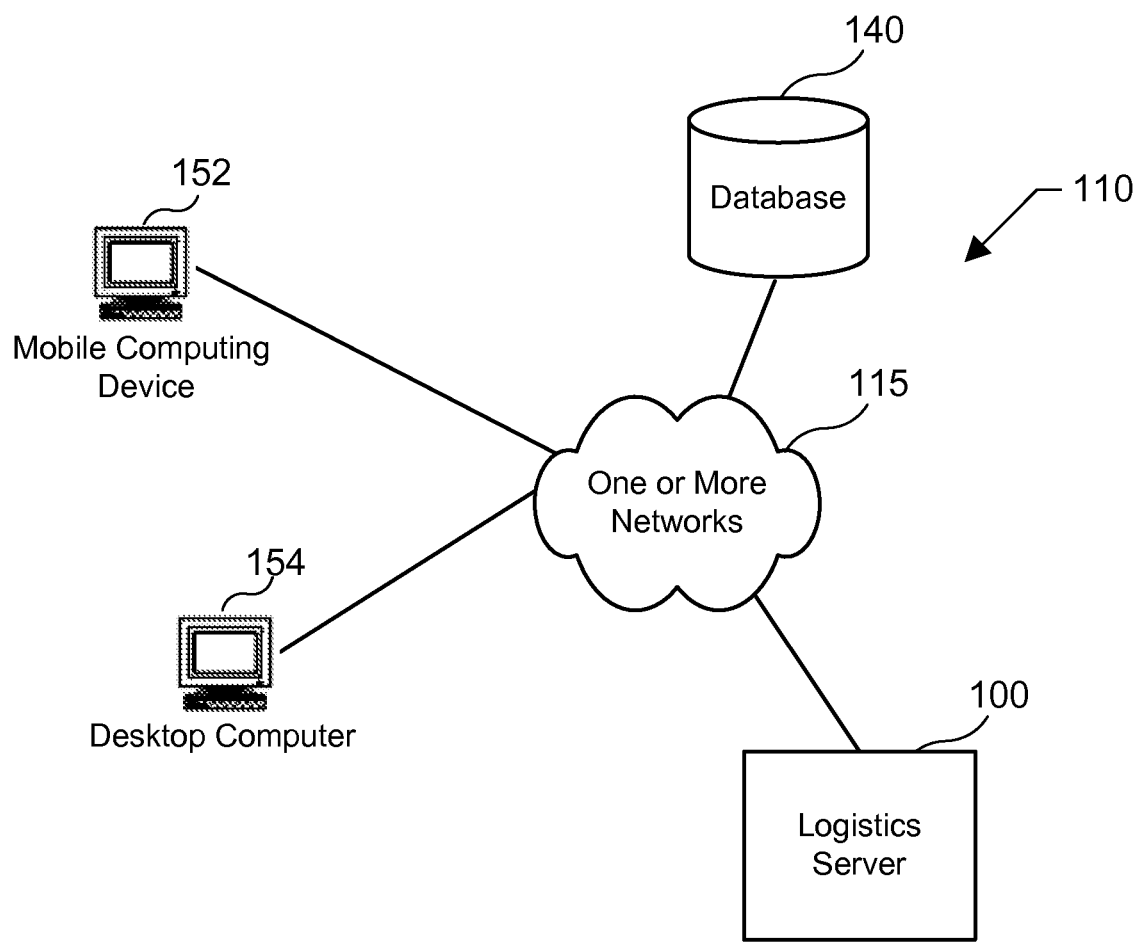
FIG. 1 is a block diagram of a logistics system in accordance with an embodiment of the present system.

In certain embodiments, each attended delivery/pickup location is manned for at least some time during the week and is equipped with a computer system that is adapted to communicate both with: (1) one or more computer systems associated with the common carrier; (2) one or more computing devices associated with the sender of the parcel; and (3) one or more computing devices associated with the recipient of the parcel. An example of a suitable computer system is shown in FIG. 1 and is described in greater technical detail at the end of this document.

In particular embodiments, a computer at the attended delivery/pickup location (e.g., an "attended delivery/pickup location computer") is adapted to send suitable messages regarding the status of parcels handled by the attended delivery/pickup location. For example, when the attended delivery/pickup location receives a parcel, the attended delivery/pickup location computer may automatically transmit an e-mail, text, or other message to: (1) the common carrier's computer system; (2) the recipient's computing device; and/or (3) the sender's computing device indicating that the parcel has been received by the attended delivery/pickup location and is ready to be picked up by the recipient. The message may also include other suitable information, such as the name and location of the attended delivery/pickup location, the days and hours of operation of the attended delivery/pickup location, and the deadline by which the individual must retrieve the parcel before, for example: (1) the item is returned to the sender; or (2) the recipient is charged for late pickup of the item.

The attended delivery/pickup location may also automatically transmit an e-mail, text, or other message to: (1) the common carrier's computer system; (2) the recipient's computing device; (3) the sender's computing device; and/or (4) any other suitable computer in response to any suitable event including, for example: (1) the parcel being picked up by the individual; (2) the parcel being returned to the carrier after a time period for retrieving the parcel has passed; (3) the parcel being transferred to another attended delivery/pickup location; or (4) any other suitable event.

In various embodiments, the system may be configured to facilitate the delivery of parcels directly to attended delivery/pickup locations from, for example, e-commerce retailers from which users may order items for delivery. For example, the system may be configured to allow a user making purchases of items via the Internet to have those items delivered directly to attended delivery/pickup locations. In such embodiments, as well as in other embodiments, the system may be configured to present users with a selection of attended delivery/pickup locations for items that the user orders.

In particular embodiments, the system may be configured to present users with attended delivery/pickup location options based at least in part on any of the following: (1) a location of the user's home; (2) a location of the user's place of work; (3) any location specified by the user (e.g., such as a location that the user frequently visits); and/or (4) any other suitable metric for determining an appropriate selection of attended delivery/pickup locations to present to the user. In various embodiments, the system may be configured to provide a selection of attended delivery/pickup locations that are: (1) within a particular distance of any of the locations described above; (2) open (e.g., are available for picking up parcels) at a time convenient to the user; (3) have certain hours of operation; and/or (4) any other factor that may be beneficial to the user or common carrier in dropping off or picking up parcels from attended delivery/pickup locations.

In various embodiments, the system is configured to confirm whether an attended delivery/pickup location has capacity to accept a parcel before directing (e.g., or redirecting) a parcel to the attended delivery/pickup location or before presenting the alternate location as a potential delivery location to a customer. This may include, for example, ensuring that there is enough physical space at the attended delivery/pickup location to accept the parcel or suitable systems in place at the attended delivery/pickup location to accommodate any special handling instructions that the parcel containing the item may have (e.g., a requirement to store the parcel at a particular temperature). In such embodiments, the system may be further configured to substantially automatically (e.g., automatically) reserve space at the attended delivery/pickup location for the parcel to ensure that the attended delivery/pickup location will not lose capacity to accept the parcel before the parcel arrives.

In various embodiments, the system is configured to enable an authorized user (e.g., a manager of an attended delivery/pickup location) to define certain attributes of a particular attended delivery/pickup location. In particular embodiments, the system is configured for receiving a request from a particular user to define (or change) one or more attributes associated with the particular attended delivery/pickup location. In some embodiments, the system is configured to verify that the particular user is authorized to define the one or more attributes associated with the particular attended delivery/pickup location (e.g., by checking a list of one or more authorized users).

Once the one or more attributes are defined, in one or more embodiments, the system is configured to accept or reject parcel delivery requests based on the attributes. In a particular example, the defined attribute is an indication that the particular attended delivery/pickup location will only accept a certain brand of product. Continuing with this example, the system then receives a delivery request for at least one parcel, which includes at least one characteristic associated with the at least one parcel. In this example, the at least one characteristic includes a description of the item contained in the at least one parcel, which is the brand the particular attended delivery/pickup location will accept. The system, in this example, determines that the particular attended delivery/pickup location will accept the delivery request based at least in part on the defined attribute of the particular attended delivery/pickup location (e.g., accepts only a certain brand of product) and the at least one characteristic of the at least one parcel (is the certain brand of product). At least partially in response to determining that the particular attended delivery/pickup location will accept the at least one parcel, the system, in this example, facilitates delivery of the at least one parcel to the particular attended delivery/pickup location.

The use of such attended delivery/pickup locations may have a variety of different advantages. First, in certain situations, the recipient of a parcel may not typically be home when parcels are commonly delivered. In such situations, it may be useful to have the parcels delivered to an attended location where an individual is available to accept and/or sign for a particular parcel and maintain the parcel in a safe location until the recipient is available to pick up the parcel. As another example, an individual may prefer to have personal deliveries made close to, but not to, their workplace so that they can retrieve the parcels when they are at work. Shipping items directly to attended delivery/pickup locations may also provide a cost savings to common carriers and other shipping and/or logistics companies by avoiding the need to deliver parcels and other items to the home addresses of individual parcel recipients. Rather, the common carriers can deliver parcels to several attended delivery/pickup locations that service a particular area where parcel recipients can go to collect their parcels.

Various additional implementations of attended delivery/pickup locations are described below, after a brief discussion of exemplary technical platforms and computer system architecture that may be used, for example, in implementing various aspects of this concept.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a System 110 according to a particular embodiment. As may be understood from this figure, the System 110 includes one or more Computer Networks 115, a Logistics Server 100, a Database 140, and one or more Computing Devices such as a Remote Computing Device 152 (e.g., such as a smart phone, a tablet computer, a wearable computing device, a laptop computer, etc.) and/or a Desktop Computer 154. In particular embodiments, the one or more Computer Networks 115 facilitate communication between the Logistics Server 100, Database 140, and one or more Computing Devices 152, 154.

The one or more Computer Networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between the Logistics Server 100 and the Database 140 may be, for example, implemented via a Local Area Network (LAN) or via the Internet.

Figure 2:
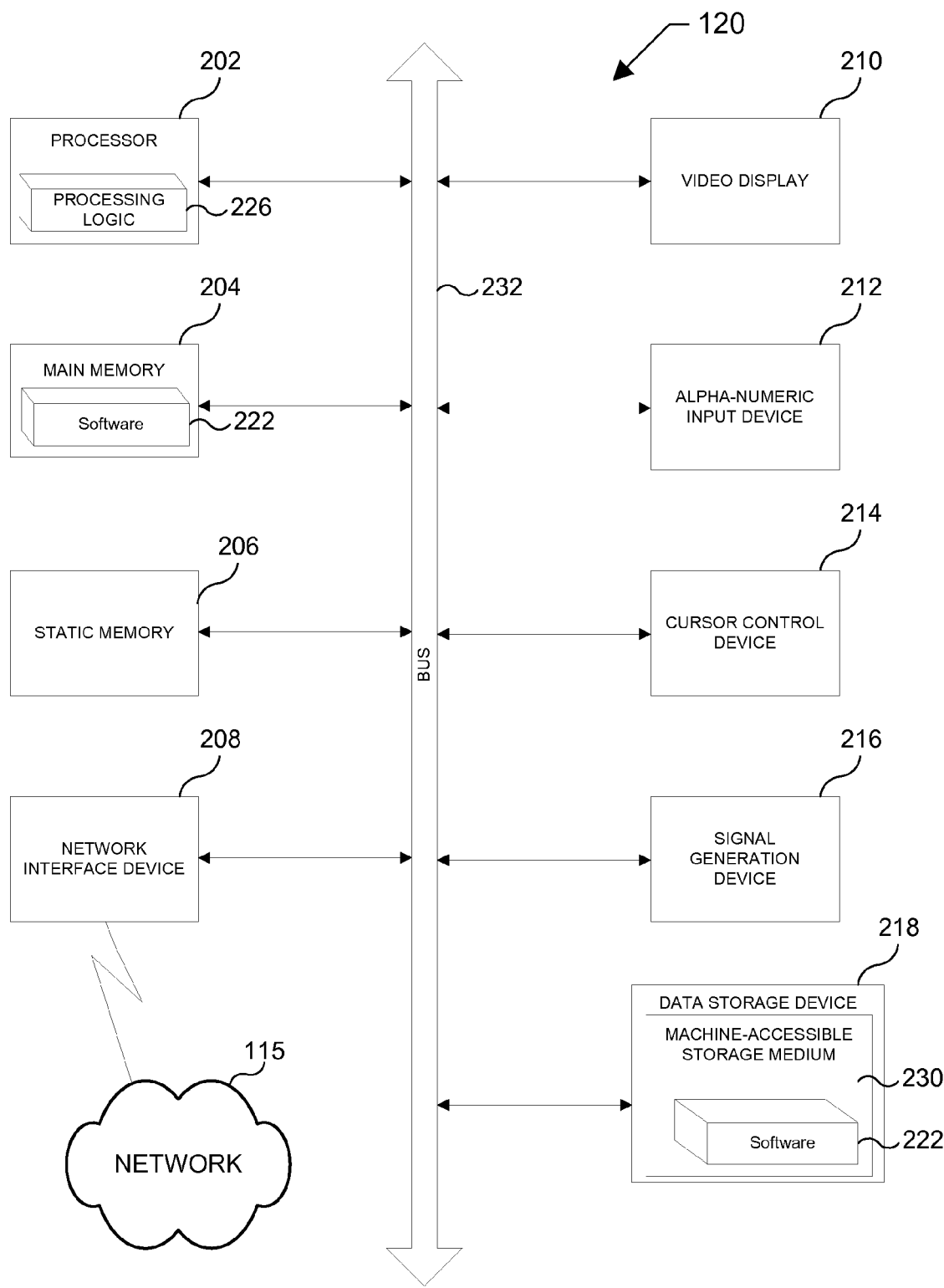
FIG. 2 is a schematic diagram of a computer, such as the logistics server of FIG. 1, that is suitable for use in various embodiments.

FIG. 2 illustrates a diagrammatic representation, in various embodiments, of the architecture of the Computer 120 that can be used within the System 110, for example, as a client computer (e.g., one of Client Computers 152, 154 shown in FIG. 1), or as a server computer (e.g., Logistics Server 100 shown in FIG. 1). In particular embodiments, the architecture of the Computer 120 may be suitable for use as a computer within the context of the System 110 that is configured to facilitate the delivery of parcels to attended delivery/pickup locations or facilitate the receipt and/or processing of parcels once they are delivered to the attended delivery/pickup locations.

In particular embodiments, the Computer 120 may be connected (e.g., networked) to other computers in a LAN, an intranet, an extranet, and/or the Internet. As noted above, the Computer 120 may operate in the capacity of a server, a client computer in a client-server network environment, and/or as a peer computer in a peer-to-peer (or distributed) network environment. The Computer 120 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary Computer 120 includes a Processor 202, a Main Memory 204 (e.g., read-only memory (ROM), flash memory, dynamic random access memory (DRAM) such as synchronous DRAM (SDRAM) or Rambus DRAM (RDRAM), etc.), a Static Memory 206 (e.g., flash memory, static random access memory (SRAM), etc.), and a Data Storage Device 218, which communicate with each other via a Bus 232.

The Processor 202 represents one or more general-purpose processors such as a microprocessor, a central processing unit, or the like. More particularly, the Processor 202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The Processor 202 may also be one or more special-purpose processors such as an application specific integrated circuit (ASIC), a field programmable gate array (FPGA), a digital signal processor (DSP), a network processor, or the like. The Processor 202 may be configured to execute Processing Logic 226 for performing various operations and steps discussed herein.

The Computer 120 may further include a Network Interface Device 208. The Computer 120 also may include a Video Display Unit 210 (e.g., a liquid crystal display (LCD) or a cathode ray tube (CRT)), an Alphanumeric Input Device 212 (e.g., a keyboard), a Cursor Control Device 214 (e.g., a mouse), and a Signal Generation Device 216 (e.g., a speaker).

The Data Storage Device 218 may include a Machine-Accessible Storage Medium 230 (also known as a non-transitory computer-readable storage medium or a non-transitory computer-readable medium) on which is stored one or more sets of instructions (e.g., Software 222) embodying any one or more of the methodologies or functions described herein. The Software 222 may also reside, completely or at least partially, within the Main Memory 204 and/or within the Processor 202 during execution thereof by the Computer 120—the Main Memory 204 and the Processor 202 also constituting computer-accessible storage media. The Software 222 may further be transmitted or received over a Network 115 via a Network Interface Device 208.

The Software 222 may represent any number of program modules, including, but not limited to an operating system (not shown), a Parcel Delivery Module 300, and a Attribute Definition Module 400. For simplicity and brevity, these modules are merely exemplary and may represent a number of program modules that control certain aspects of the operation of the Computer 120. The Parcel Delivery Module 300 and the Attribute Definition Module 400 are described in more detail below.

While the Machine-Accessible Storage Medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a system for delivering parcels to attended delivery/pickup locations may be implemented within the context of any suitable logistics service. For example, particular embodiments may be implemented within the context of any suitable logistics service offered by United Parcel Service, Inc. of Atlanta, Ga. Various aspects of the system's functionality may be executed by certain system modules, including a Parcel Delivery Module 300. This module is discussed in greater detail below.

Parcel Delivery Module

Figure 3:
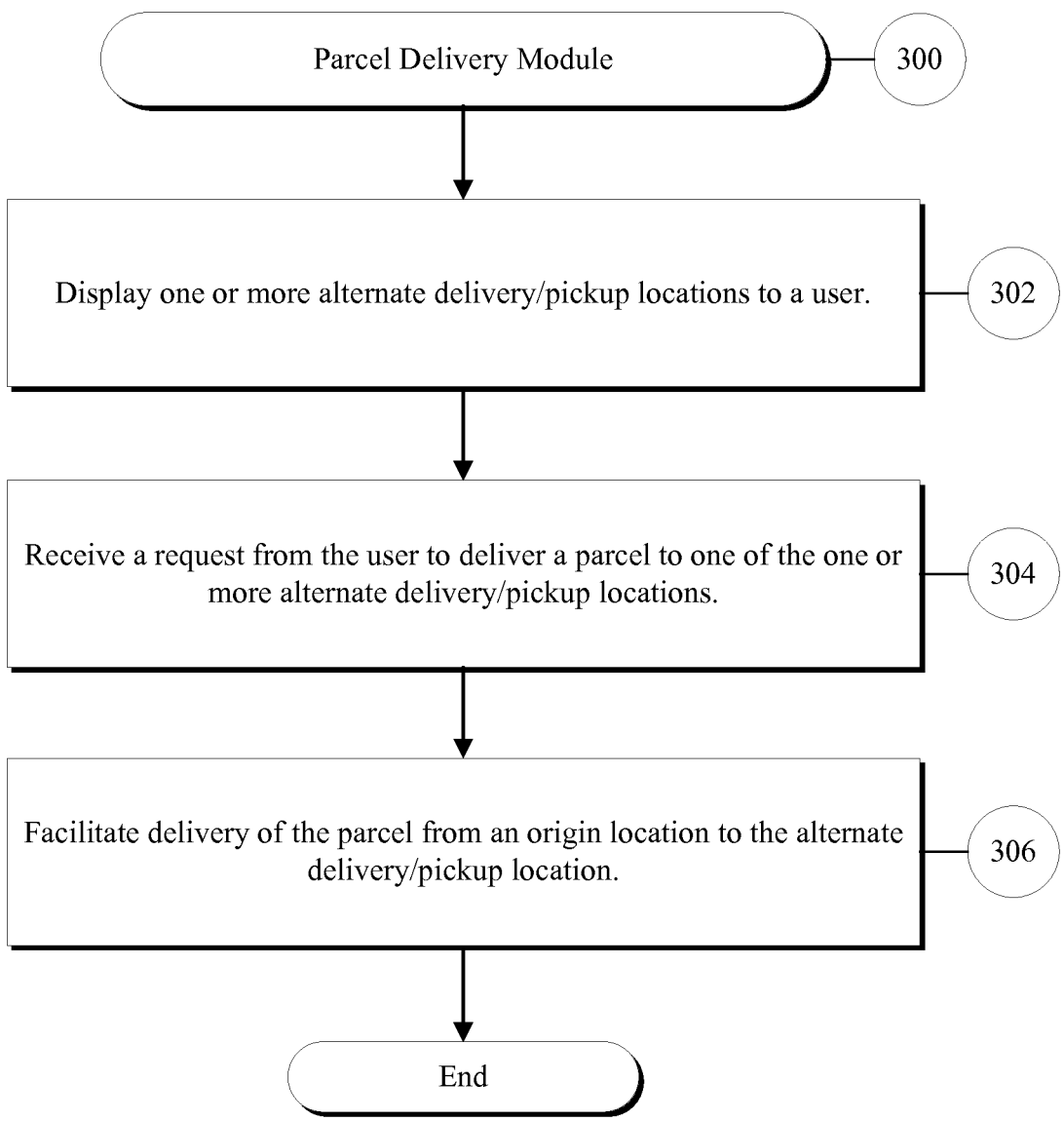
FIG. 3 depicts a flowchart that generally illustrates various steps executed by a parcel delivery module that, for example, may be executed by the logistics server of FIG. 1.

FIG. 3 is a flow chart of operations performed by an exemplary Parcel Delivery Module 300. In particular embodiments, the Parcel Delivery Module 300 may facilitate the delivery of parcels to an attended delivery/pickup location.

When executing the Parcel Delivery Module 300, the system begins, at Step 310, by displaying one or more attended delivery/pickup locations to a user. In various embodiments, these attended delivery/pickup locations include retail stores (e.g., including gas stations, grocery stores, and pharmacies), stand-alone kiosks, or any other suitable locations for receiving and holding parcels for pick up by recipients. In particular embodiments, attended delivery/pickup locations include attended delivery/pickup locations, but they may also include unattended delivery/pickup locations. In some embodiments, attended delivery/pickup locations may include locations (e.g., retail locations) other than the intended parcel recipient's home or business.

In various embodiments, the system may configured to determine and display available attended delivery/pickup locations based on any suitable criteria. For example, the system may be adapted to: (1) allow a user to request that the system display all attended delivery/pickup locations within a predetermined radius of the user; and (2) in response to the request, displaying all attended delivery/pickup locations within the predetermined radius of the user. In another embodiment, the system may be adapted to: (1) determine a location that a user is frequently located (e.g., the user's home or workplace); and (2) displaying all attended delivery/pickup locations within the predetermined radius of the location.

In particular embodiments, the system may be adapted to allow a vendor or other entity to open one or more attended delivery/pickup locations for a particular customer or event. In other embodiments, the system may be adapted to allow a vendor (e.g., a particular retailer) to select a subgroup of a group of available attended delivery/pickup locations that the vendor's products may be delivered to, and/or to exclude a subgroup of available delivery/pickup locations for delivery of the vendor's products. This feature may be particularly desirable for vendors who have a certain brand image that is inconsistent with the image of certain attended delivery/pickup locations (e.g., a high-end jewelry retailer may not wish to have their products picked up at a gas station, but may be happy to have their products picked up at a high-end department store).

The system continues, at Step 320, by receiving a request from the user to deliver a parcel to a particular one of the one or more attended delivery/pickup locations (which may, for example, have no formal relationship to the user). In particular embodiments, the request may come from the user after the user reviews a plurality of available attended delivery/pickup locations (see Step 310, above) as part of a checkout process when the user purchases an item from an online retail store.

The system continues, at Step 330, by facilitating the delivery of the parcel from an origin location to the attended delivery/pickup location. The origin location may include a home of the parcel sender, a warehouse associated with an online retailer, a retail store, or any other suitable location. In various embodiments, the system may facilitate the delivery of the parcel via any suitable common carrier or other logistics provider, etc.

In various embodiments, a system for delivering parcels to attended delivery/pickup locations may comprise features in addition to the system described above. These additional features are described more fully below.

A. Use of Attended Delivery/Pickup Locations within Brick-and-Mortar Stores

In various embodiments, an attended delivery/pickup location may be provided within a brick-and-mortar store, such as a department store, and used to facilitate the provision of adequate inventory to the store. The attended delivery/pickup location may be staffed by a third party (e.g., by an entity other than the brick-and-mortar store), or by the brick-and-mortar store itself.

In a particular embodiment, a separate attended delivery/pickup location is provided in each individual store within a network of department stores (or within a network of otherwise unaffiliated department stores or other stores). In various embodiments, the attended delivery/pickup locations are used to facilitate the transfer of items between the stores (or the purchase of one or more items from the inventory of another, unrelated store). In a particular example, a customer may visit a first department store location within a network of department stores (e.g., a brick and mortar "ABC Shoes" location in Marietta, Ga.), try on a particular pair of shoes in size 10.5, and determine that they actually need a size 11 in the shoes. If the Marietta location of ABC Shoes does not have the shoes in size 11, employees of the store may search nearby ABC Shoes locations (and/or the inventory of other shoe stores) to determine whether a nearby store has the shoes in size 11. Upon determining that another store has the shoes in the desired size, an employee of the Marietta store may use their computer to issue a request to the identified store (e.g. an ABC Shoes store in Alpharetta, Ga., or an XYZ store in Macon, Ga.) to send a pair of appropriate size 11 shoes to the Marietta ABC Shoes location.

In response to receiving the request, an employee at the Alpharetta ABC Shoes location may bring a box containing a size 11 pair of the shoes to an attended delivery/pickup location within the Alpharetta ABC Shoes. Representatives of the attended delivery/pickup location then facilitate the delivery of the shoes from the Alpharetta ABC Shoes store to the Marietta ABC Shoes store. In particular embodiments, this may reduce the overall cost of transporting the shoes from the first retail location to the second retail location because the carrier that services the attended delivery/pickup locations within the first and second retail locations may deliver items in bulk from the first location to the second location on a regular basis. The items may be, for example, transported together in a single container and/or transported directly from the first retail location to the second location, which may serve to reduce the per-item costs associated with transporting the items.

In various embodiments, when a particular item sought by a customer shopping at a particular retail store is unavailable (e.g., such as the shoes in size 11 in the example described above), the customer may request to have the item sent to an attended delivery/pickup location other than the attended delivery/pickup location at the particular retail store. In the size 11 shoe example above, the customer would be able to request to have the shoes sent to an attended delivery/pickup location other than the attended delivery/pickup location at the ABC Shoes in Marietta. The user may, for example, request to have the shoes delivered to an attended delivery/pickup location that is convenient to the user (e.g., such as an attended delivery/pickup location located near the customer's home or office).

In-store attended delivery/pickup locations may also be used in restocking the store's inventory from one or more warehouses (or other stores in the store's network of stores, which may include stores that are otherwise unrelated to the store). In particular embodiments, a carrier associated with the attended delivery/pickup locations coordinates regular shipments (e.g., bulk shipments) from each particular warehouse to each particular department store location. In various embodiments, new inventory is received at the store by workers who are associated with the attended delivery/pickup locations. The workers then coordinate the transfer of the items to store employees for stocking.

In various embodiments, in-store attended delivery/pickup locations may also be used to facilitate the return of items purchased from a retail web site that is: (1) associated with the department store in which the attended delivery/pickup location is located; and/or (2) not associated with the department store in which the attended/delivery/pickup location is located. For example, in a particular embodiment, an in-store attended delivery/pickup location within a particular BIG DEALS department store may be set up to accept returns of items purchased from www.Big Deals.com. In such cases, if a user purchases an item from www.Big Deals.com and wishes to return it, they may simply bring the item to the in-store attended delivery/pickup location within their local Big Deals department store and receive a refund for the item. In particular embodiments, there is no shipping charge (or other charge) associated with returning the item.

As another example, an in-store attended delivery/pickup location within a particular "Big Deals" department store may be set up to accept returns of items purchased from a retail web site that is unrelated to Big Deals. For example, the in-store attended delivery/pickup location may be set up to accept returns of items purchased from a retail web site called www.bestbargain.com. In a particular embodiment, if the user purchases an item from www.bestbargain.com and wishes to return it, they may bring the item to the in-store attended delivery/pickup location within their local Big Deals department store and receive a refund for the item. In particular embodiments, there is no shipping charge (or other charge) associated with returning the item.

In various other embodiments, the attended delivery/pickup location, the logistics company shipping the returned item, and/or the retail web site to which an item is being returned may charge the customer for returning the item. In particular embodiments, the return charge may be shared among one or more of: (1) the attended delivery/pickup location; (2) the logistics company shipping the returned item; (3) and/or the retail web site to which the item is being returned. In other embodiments, the return charge less the cost of shipping the item back to the retail website is shared rather than the full return charge. In other embodiments, the return charge may be shared among one or more of the attended delivery/pickup location, the logistics company shipping the returned item, and/or the retail web site to which an item the being returned in disproportionate quantities (e.g., 50% to the logistics company, 25% to the retail website, and 25% to the attended delivery/pickup location).

In particular embodiments, an in-store, attended delivery/pickup location within a particular brick-and-mortar store may be set up to: (1) receive items purchased at the store from users; and (2) ship the items to a location designated by the user (e.g., to the user's residential or business address, or to the address of another individual). In particular embodiments, the individual may: (1) not be charged for shipping the item; (2) be charged a discounted fee for shipping the item; or (3) may be charged the full fee for shipping the item. In various embodiments, the charge associated with shipping the item may depend upon the cost of the items (e.g., the customer may receive free or discounted shipping of purchases above a pre-determined threshold cost). In other embodiments, individuals who are members of a particular shipping subscription service may receive free or discounted shipping of items purchased at the retail location.

B. Customization of Networks of Attended Delivery/Pickup Locations

In various embodiments, the system may be adapted to allow users to define their own network of attended delivery/pickup locations. For example, a central logistics computer system (which a user may, for example, access via the Internet) may be configured to display respective graphical representations of a plurality of attended delivery/pickup locations on a map of an area associated with a particular user (e.g., a map of an area in which the user's home or business is located). The system may allow the user to select one or more attended delivery/pickup locations displayed by the graphical user interface as the default delivery/pickup locations to which any parcels to be delivered to the user by a particular logistics provider are to be delivered. For example, the user may select: (1) a first of the attended delivery/pickup locations as a primary attended delivery/pickup location that the logistics provider should deliver any of the user's parcels to, if the attended delivery/pickup location is available; and (2) one or more alternative attended delivery/pickup locations that the logistics provider should deliver any of the user's parcels to, if the primary attended delivery/pickup location is unavailable.

In various embodiments, if a particular delivery/pickup location becomes unavailable to accept deliveries during a particular period of time (e.g., the delivery/pickup location becomes full, or temporarily or permanently closes), the system may modify the graphical representation of the particular delivery/pickup location to indicate its unavailability. For example, the system may display one or more portions of the graphical representation of the particular delivery/pickup location in gray rather than black to indicate its current unavailability to accept packages.

C. Economic Models Associated with Holding Items for Pickup

In particular embodiments, the system may be configured for, in response to a parcel being delivered to a particular delivery/pickup location, generating an e-mail to the recipient of the parcel indicating a deadline by which the recipient must retrieve the parcel from the delivery/pickup location. In particular embodiments, the system saves this deadline to memory and, in response to the deadline passing without the system receiving an indication that the parcel has been picked up from the delivery/pickup location by the deadline, the system facilitates the return of the parcel from the delivery/pickup location to the parcel's sender. In various embodiments, the system facilitates the parcel's return by transmitting a message to an appropriate logistics server instructing a logistics provider to pick the parcel up from the delivery/pickup location and return the parcel to the parcel's sender.

In order to encourage customers to retrieve parcels before the stated deadline, the system may be adapted to provide one or more financial incentives for the parcel recipient retrieving the parcel by an early pickup deadline that is before the stated normal parcel pickup deadline. For example, the system may be adapted to provide the customer with a free or discounted future logistics service (or other financial incentive) in response to the user retrieving their parcel more than a day before the stated normal parcel pickup deadline. Similarly, the system may be adapted to allow users to extend the deadline by, for example, paying a fee to extend the deadline.

D. Method of Allowing Individuals to Coordinate Delivery of an Item to an Attended Delivery/Pickup Location Via a Non-Participating Website In particular embodiments, the system may be adapted to allow a user to facilitate the delivery of an item ordered on a retail website to a particular attended delivery/pickup location. In a particular embodiment, the system first provides the user with an address associated with a particular logistics provider, as well as a code (e.g., a unique code) associated with the user. When the user completes an order of an item on a retail website, the user enters the logistics-provider-designated address in the delivery address field on the retail website, along with the code associated with the user.

As a result, when the retailer sends the item to the user in a parcel, the retailer attaches a shipping label to the parcel that includes the logistics-provider-designated address and user code. The parcel is then shipped to the logistics-provider-designated address by any suitable logistics provider (which may or may not be the particular logistics provider referenced above). Once the particular logistics provider receives the parcel at the logistics-provider-designated address, the particular logistics provider reads the user code and uses the user code to retrieve delivery information associated with the user from a data store, such as a database. The delivery information may include, for example, the user's name, contact information (e.g., e-mail address, cell phone number, etc. . . . ), and the address of the user's preferred attended delivery/pickup location.

The logistics provider may then: (1) facilitate the delivery of the parcel to the user's preferred attended delivery/pickup location (or other suitable attended delivery/pickup location); and (2) use the user's contact information to contact the user and inform them that the parcel will be delivered to the attended delivery/pickup location and provide them with instructions for retrieving the parcel. In a particular embodiment, the logistics provider may facilitate the delivery of the parcel to the user's preferred attended delivery/pickup location by relabeling the parcel with the user's name and address of the attended delivery/pickup location.

In alternative embodiments, the system may be adapted so that when the user completes an order of an item on the retail website, the user simply enters a code associated with the user and selects a particular logistics provider to handle delivery of the item to the user. In various embodiments, the logistics provider uses the code to retrieve user and delivery information in the manner described above. The logistics provider then uses the user and delivery information to facilitate delivery of the item to the user.

E. Systems for Facilitating Proper Handling of Parcels at an Attended Delivery/Pickup Location In various embodiments, the system may be adapted to remind individuals at each attended delivery/pickup location to enter information associated with parcels into the system as the parcels arrive at the attended delivery/pickup location. For example, the system may be adapted to display a reminder message at predetermined times during each work day that reminds users to use a bar code scanner associated with the system to scan the labels of any parcels that arrive at the attended delivery/pickup location. In other embodiments, the system may be adapted to display such reminders around times that parcels are scheduled to arrive at the attended delivery/pickup location. This may help to assure that information regarding each parcel is promptly entered into the system.

In particular embodiments, the system may be adapted for receiving information regarding the scheduled closure of each attended delivery/pickup location (e.g., holiday closures or permanent closures). The system may further be configured for: (1) communicating this information to users; (2) facilitating the rerouting of any parcels that are scheduled to be delivered to the attended delivery/pickup location while the attended delivery/pickup location is scheduled to be closed; and/or (3) removing the attended delivery/pickup location as an option for receiving deliveries while the attended delivery/pickup location is scheduled to be closed.

The system may also be adapted to employ various techniques for determining that a particular parcel has been delivered to a particular attended delivery/pickup location. For example, the system may be adapted to: (1) receive an indication that a particular parcel has been scanned at drop off; (2) receive data regarding the location at which the parcel was scanned at drop off (e.g., using GPS functionality associated with a handheld device or other electronic device); (3) compare the location with the geolocations of one or more attended delivery/pickup locations; and (4) in response to determining that the location at which the parcel was scanned at least generally corresponds to the geolocation of a particular attended delivery/pickup location, verify that the parcel has been delivered to the particular attended delivery/pickup location; and (5) save an indication to the system's memory indicating that the parcel has been delivered to the particular attended delivery/pickup location. In various embodiments, the system is further adapted to send confirmation (e.g., via e-mail, text message, etc.) to a recipient of the delivery of the particular parcel at least partially in response to verifying that the parcel has been delivered to the particular attended delivery/pickup location. In particular embodiments, the system is further adapted to send a request for confirmation of delivery to the attended delivery/pickup location and to receive such confirmation.

F. Systems for Facilitating Signature of Documents at Attended Delivery/Pickup Locations In various embodiments, attended delivery/pickup locations may be configured to manage the signature of documents, such as contracts and other legal documents. In a particular embodiment, to facilitate the signature of a contract, a first individual may send the document to a particular attended delivery/pickup location to be signed by a second individual. The delivery of the document to the attended delivery/pickup location may be facilitated as outlined above, and—when the document arrives at the particular attended delivery/pickup location, the system may notify the second individual that the document has arrived and provide instructions for the second individual to come to the particular attended delivery/pickup location and sign the document.

The second individual may then travel to the particular attended delivery/pickup location and, after providing identification (e.g., in the form of an ID card or a code displayed on the individual's mobile computing device) to a representative of the attended delivery/pickup location, sign the contract. The representative may then verify, in any suitable manner that the contract has been signed by the correct individual. For example, the representative may notarize the document and/or enter information into a data store associated with the system confirming that the contract has been signed by the correct individual. The representative may also create an electronic copy of the document and save the signed document into the system's memory for later retrieval and/or electronic transmission to the first and second individuals. Finally, the system and/or representative may coordinate the return of the original signed document to the first or second individual for their files.

In various embodiments, the document to be signed may include a unique bar code that is used to identify the document, track the document, and/or store the document in memory. In various embodiments, the unique barcode may be used to identify the document as well as the one or more signors of the document.

G. Provision of Value-Added Services at Attended Delivery/Pickup Locations

In particular embodiments, representatives at attended delivery/pickup locations may provide one or more value-added services on parcels and/or items at the attended delivery/pickup locations. This may occur, for example, as items and/or parcels are being returned for a refund, or simply shipped to another location. For example, the representatives may: (1) pack the items for shipping; (2) gift wrap the items; (3) facilitate the return of items to a retailer for a refund or exchange (see below); and/or (4) complete any other value-added service.

H. Use of Attended Delivery/Pickup Locations within Shopping Centers

A further use of attended delivery/pickup locations involves providing one or more attended delivery/pickup locations within a shopping center (e.g., a mall). In a particular embodiment the attended delivery/pickup locations are configured to: (1) receive items purchased at the shopping center from users; and (2) ship the items to a location designated by the user (e.g., to the user's residential or business address, to an attended delivery/pickup location close to the user's residential or business address, and/or to another address designated by the user). This may allow a user to purchase items at the shopping center and then facilitate transporting the purchased items to the user's home or another location without the hassle of leaving the shopping center with the items, transporting the items, etc. . . . .

I. Capacity Management Techniques

In particular embodiments, a computer system may be used to estimate the current and/or future capacity of the attended delivery/pickup locations to receive and store parcels. This may be done, for example, using a particular algorithm that assumes, for example, that any parcels will be of a certain average size and will be stored by the attended delivery/pickup locations for a certain period of time before being picked up by a parcel recipient.

In other embodiments, the system may use more precise methods for monitoring the current and/or future capacity of attended delivery/pickup locations to receive and store parcels. For example, the volume of storage space within each attended delivery/pickup location may be stored within the system, and the actual dimensions of each parcel may also be entered into the system when the parcel is received by a logistics company and/or the attended delivery/pickup location. The system may then use this information to: (1) calculate the total volume of parcels that are being stored, or that will be stored, at a particular attended delivery/pickup location at a particular time; and (2) estimate the available capacity of the attended delivery/pickup location to store additional parcels by comparing the calculated parcel volume with the volume of storage space at the attended delivery/pickup location.

In particular embodiments, the system is adapted to determine that an attended delivery/pickup location is unavailable to accept additional deliveries if the estimated volume or number of parcels stored at the attended delivery/pickup location (or to be stored at the attended delivery/pickup location) is within a particular predetermined percentage of the attended delivery/pickup location's capacity. For example, if the attended delivery/pickup location is determined to be at 95% maximum capacity, the system may determine that the attended delivery/pickup location is unavailable to accept additional deliveries. In such a case, the system may reroute parcels scheduled to be delivered to the attended delivery/pickup location to an alternative attended delivery/pickup location and/or show the attended delivery/pickup location as being currently unavailable.

In other embodiments, the system may use one or more of the following different factors to determine whether a particular attended delivery/pickup location has the capacity to accept a particular parcel. Such factors include, for example: (1) the weight of a parcel; (2) the dimensions of the parcel; (3) average latency of parcels at the attended delivery/pickup location; (4) one or more characteristics of the parcel's intended recipient (e.g., how quickly the intended recipient usually retrieves parcels from attended delivery/pickup locations); (5) typical characteristics of the clientele of the delivery/pickup location (e.g., how quickly the average customer of the attended delivery/pickup location retrieves parcels from the attended delivery/pickup location); (6) the cubic parcel storage capacity of the attended delivery/pickup location; (7) the density of the parcel and/or (7) the ability of the attended delivery/pickup location to extend its capacity to accept parcels. The system may also take into account the amount of labor required to physically add the parcel to the current inventory of the attended delivery/pickup location.

J. Methods for Recommending Attended Delivery/Pickup Locations to Users

In various embodiments, the system may be adapted to recommend particular attended delivery/pickup locations for the delivery of a particular parcel. In particular embodiments, the system may be adapted to automatically generate suitable recommendations based, at least in part, on: (1) the distance of the attended delivery/pickup location from a location specified by the user; (2) the estimated current or future capacity of the attended delivery/pickup location to accept deliveries; (3) trends in activity associated with the particular attended delivery/pickup location (e.g., if an attended delivery/pickup location experiences an day-to-day increase in volume above a certain threshold, the system won't recommend the attended delivery/pickup location for a predetermined number of days); or (4) any other suitable factors. After the system recommends one or more particular delivery/pickup locations, the user may either select one of the recommended attended delivery/pickup locations to receive the delivery, or specify a non-recommended attended delivery/pickup location to receive the delivery.

K. Methods for Handling a Parcel that is Destined for an Attended Delivery/Pickup Location that has No Additional Capacity In some cases, a logistics system or other system may determine that a particular parcel is en route to a particular attended delivery/pickup location that has inadequate capacity to accept the parcel. In such cases, the system may, for example: (1) block the delivery of the parcel to the particular attended delivery/pickup location, re-route the parcel to an alternative attended delivery/pickup location, and inform the intended parcel recipient of the change; (2) hold the parcel for a predetermined period of time, deliver the parcel to the particular attended delivery/pickup location at a later time, and inform the intended recipient of the scheduling change; (3) deliver the parcel to the recipient's home or place of business; or (4) handle the situation in any other suitable manner. The system may determine which of the above approaches to take based at least in part, for example, on one or more user-specified preferences.

L. Methods for Determining Alternative Attended Delivery/Pickup Location

In various situations, such as the situation described immediately above, the system may re-route a parcel to an alternative attended delivery/pickup location. In such situations, the alternative attended delivery/pickup location may be identified based on, for example: (1) the distance of the alternative attended delivery/pickup location from the original, target attended delivery/pickup location; (2) the distance of the alternative attended delivery/pickup location from the customer's residence or place of business; (3) the last attended delivery/pickup location used by the customer; or (4) a previous preference expressed by the intended recipient of the parcel.

M. Methods for Allowing Customer to Reserve Space in an Attended Delivery/Pickup Location In certain embodiments, the system may be adapted to allow users to reserve space for a particular parcel at a particular attended delivery/pickup location so that delivery to the particular attended delivery/pickup location (rather than an alternative location) is guaranteed. The system may or may not charge the parcel recipient for making such a reservation. In certain embodiments, the system provides such reservations free of charge to those subscribing to a paid premium logistics service.

In various embodiments, the system is adapted to allow users to reserve one or more spaces (e.g., a block of spaces) at an attended delivery/pickup location. In particular embodiments, the system is adapted to allow users to reserves the one or more spaces at a time before any parcels are scheduled for delivery for the user at the attended delivery/pickup location where the user reserved the one or more spaces. The user may, for example, reserve the one or more spaces on a particular day (e.g., or days) in the future. In various embodiments, the ability to reserve attended delivery/pickup spaces in advance may allow users to ensure that there will be space at the attended delivery/pickup location for a future order that the user is planning, or for a future shipment that the user anticipates receiving.

In particular embodiments, the users reserving the space may include individuals, customers, manufacturers, corporations, etc. For example, a company releasing a new product (e.g, Apple® releasing a new smartphone) may reserve one or more spaces at various attended delivery/pickup locations for the release date of the product. The company may then schedule shipment of the new product to each of the attended delivery/pickup locations in order to allow users to pick up the product ordered by the customer or purchase the product directly from the attended delivery/pickup location on the release date. In this way, attended delivery/pickup locations may serve as temporary storefronts for companies who may, for example, wish to increase the availability of their product, or facilitate a more convenient purchase or pickup of the product by their customers.

N. Methods for Facilitating the Return of Items Using an Attended Delivery/Pickup Location Attended delivery/pickup locations may be configured, in some embodiments, to facilitate the return of previously purchased items to a retailer for a refund or exchange. For example, in particular embodiments, a representative at an attended delivery/pickup location (and/or a computer system associated with the attended delivery/pickup location) determines whether a particular item may be returned/exchanged and: (1) if the item may not be returned/exchanged, inform the individual attempting to return the item that the item may not be returned/exchanged; or (2) if the item may be returned/exchanged, facilitate the return/exchange of the item in accordance with terms specified by the retailer to which the item is to be returned. In a particular embodiment, the system may be adapted to: (1) read a machine-readable indicia (e.g., a UPC code, a transaction code associated with the sale of the item to the individual attempting to exchange the item, or other suitable item identifier) associated with an item to be returned; and (2) use information derived from the machine-readable indicia to determine whether the item may be returned/exchanged. In particular embodiments, the derived information may include a deadline for returning/exchanging the item. If an item is currently eligible to be returned or exchanged, the system may optionally determine when the user should receive either a refund for the item or a substitute item and provide this information to the user.

In a particular embodiment in which the user is returning an item to a retail website by dropping the item at an attended delivery/pickup location, the system may be configured to provide a return label for placing on a parcel containing the item that the user is returning. In various embodiments, the return label may expire at the end of a particular return period (e.g., a period provided by the retail website in which the user (e.g., customer) may return items to the retail website in exchange for a full or partial refund). In particular embodiments, if the return label has not expired, the system may facilitate the shipment of the returned item from the attended delivery/pickup location to the retail website (e.g., a warehouse, storage facility, or processing facility associated with the retail website) at no cost to the user. In various embodiments, the system, in response to determining that the return label has expired, may facilitate the shipment of the returned item from the attended delivery/pickup location to the retail website (e.g., a warehouse, storage facility, or processing facility associated with the retail website) after charging the user a return fee. In other embodiments, if the return label has expired, the system may facilitate the shipment of the returned item from the attended delivery/pickup location to the retail website (e.g., a warehouse, storage facility, or processing facility associated with the retail website) at no cost to the user; the system may then be configured to notify the retail website that the return period for the returned item has expired, and the retail website may charge the user for the return (e.g., deduct the cost of shipping the returned item from any refund to which the user may be entitled).

In various embodiments, a computer system at each attended delivery/pickup location may be adapted to provide users with access to one or more checklists and/or questionnaires that may be used to make sure that all parts of a particular item are present before the item is returned to a retailer for a refund or exchange. This may save the retailer time and money associated with replacing sub-parts of returned items.

O. Methods for Facilitating the Pickup of Parcels or Other Items from an Attended Delivery/Pickup Location Various techniques may be used to facilitate the pickup of parcels or other items from an attended delivery/pickup location. For example, a user may be provided with an electronic ID card or other device that may be used to quickly identify the individual and any parcels that are to be picked up by the individual at a particular attended delivery/pickup location. Similarly, the user may be provided with an application on the user's mobile computing device that facilitates identification of the user via near field communications, or one or more bar codes displayed on the screen of the mobile device. Such a bar code may alternatively be printed (e.g., as a voucher) and presented to a representative of an attended delivery/pickup location to facilitate quick identification and pickup of one or more parcels stored at the attended delivery/pickup location.

In various embodiments, the system may be adapted to facilitate the pickup of a parcel by an individual other than the intended recipient of the parcel by, for example, having the intended recipient transfer the electronic ID card (or a printed voucher generated by the system) to another individual. The other individual may then present the electronic or physical ID card or voucher to a representative at the attended delivery/pickup location to verify that the individual is authorized to pick up the parcel on the intended recipient's behalf. After the representative uses the system to verify the authenticity of the electronic or physical ID card or voucher, the representative may transfer the parcel to the individual.

In various embodiments, the electronic ID card discussed above may be adapted so that it is only valid when the electronic ID card (or a device displaying the card) is located at a particular geographic location (e.g., at or near a particular GPS coordinate, or within a particular Bluetooth network, or close enough to a particular computing device to communicate with the device using near field communications).

In various embodiments, the system may be adapted to create an electronic token to verify that the user's computing device (and, therefore, presumably the user) was present at a location when a parcel was picked up. This may serve as evidence that the parcel was picked up by the intended recipient rather than another individual.

P. Methods for Facilitating the Immediate Sale and Delivery of Popular Items from an e-Commerce Site In particular embodiments, an attended delivery/pickup location may stock one or more items that sell frequently on an e-commerce web site (e.g., bestselling books, DVD's, or CD's). In particular embodiments, when a user of the e-commerce web site indicates that they wish to purchase such an item, the system may search the inventory of one or more attended delivery/pickup locations that are geographically close to the user (as determined by the user's mobile device, from information provided by the user, etc. . . . ) to determine whether the attended delivery/pickup locations have the item in stock. If so, the system may inform the user that a nearby attended delivery/pickup location has the item in stock, and provide the user with the option of paying for the item online and then picking the item up (e.g., substantially immediately on the same day) from the nearby attended delivery/pickup location.

In such cases, after the user purchases the item on the e-commerce site, the system may generate a physical or electronic receipt that the user may use to retrieve the item from the identified attended delivery/pickup location. The system may also electronically notify the attended delivery/pickup location that the user has purchased the item and request that the item be set aside for the user.

Q. Methods and Systems for Training Employees of an Attended Delivery/Pickup Location In particular embodiments, each attended delivery/pickup location may be provided with a client computer that may be switched between an active mode (in which the client computer is adapted to facilitate the pickup, delivery, and/or tracking of parcels), and a training mode (in which the client computer is adapted to train individuals how to use the system). In particular embodiments, when the client computer is in the training mode, the computer simulates the operation of the computer when the computer is in active mode and provides instructions on how to properly operate the computer.

R. Methods and Systems for Conducting a Survey at an Attended Delivery/Pickup Location In particular embodiments, when a user picks up a parcel at a particular attended delivery/pickup location, the user is presented with an electronic survey of their experience at the attended delivery/pickup location. If the user rates the experience highly (e.g., 9-10 out of a possible 10), the system invites the user to go onto a social media website, such as Facebook, to provide comments and/or other feedback. This may help to expand the number of positive comments on the social media website.

S. Provision of Customized Web Site for Each Attended Delivery/Pickup Location

In various embodiments, the system is adapted to provide a customized website for each attended delivery/pickup location. The website may include a private portion that may only be accessed by individuals associated with the particular attended delivery/pickup location. This private portion may display, for example, information regarding how much the attended delivery/pickup location has earned through delivery/pickup activities and other relevant information.

The website may also include a public portion that allows the particular attended delivery/pickup location to advertise special offers, such as offers for discounted merchandise. In particular embodiments, particular offers may only if the user retrieves their one or more parcels from the attended delivery/pickup location before a particular location.

T. Methods for Enabling Users to Define Attended Delivery/Pickup Location Attributes In particular embodiments, the system is adapted to allow users of the system to define and change various attributes associated with a particular attended delivery/pickup location. Particular attributes which a user may define include, for example, the hours of operation of the attended delivery/pickup location. For example, a user may define hours of operation based at least in part on the hours of operation of the retail store at which the attended delivery/pickup location is located. In various embodiments, users may define hours of operation based on any other suitable factor and may change hours of operation for any suitable reason (e.g., based at least in part on or due to staff availability to man the attended delivery/pickup location, based at least in part on holidays or holiday schedules, etc.).

In other embodiments, users may define which particular items may be delivered to and/or temporarily stored at the attended delivery/pickup location. For example, a user may define an attended delivery/pickup location such that the attended delivery/pickup location may only accept a particular model of a new mobile computing device. In particular embodiments, the system may be configured to limit accepted items to allowed items by using one or more stock-keeping units (e.g., SKUs) associated with the allowed items. In other embodiments, the system may ensure that only allowed items are accepted by the attended delivery/pickup location using any other suitable technique (e.g., by scanning a barcode associated with an item when it is presented to the attended delivery/pickup location, etc.).

In particular embodiments the system may be configured to allow a user to define any other attribute associated with the attended delivery/pickup location. In various embodiments, the system may be configured to receive a listing of one or more users who are authorized to define and/or change the various attributes associated with the attended delivery/pickup location. Authorized users may include, for example, the owner of the attended delivery/pickup location, the owner of the retail store in which the attended delivery/pickup location is located, an authorized manager or employee of the attended delivery/pickup location or the retail store with which the attended delivery/pickup location is associated, an authorized representative of a logistics company associated with facilitating delivery and/or pickup of items to or from the attended delivery/pickup location, etc.

Figure 4A:
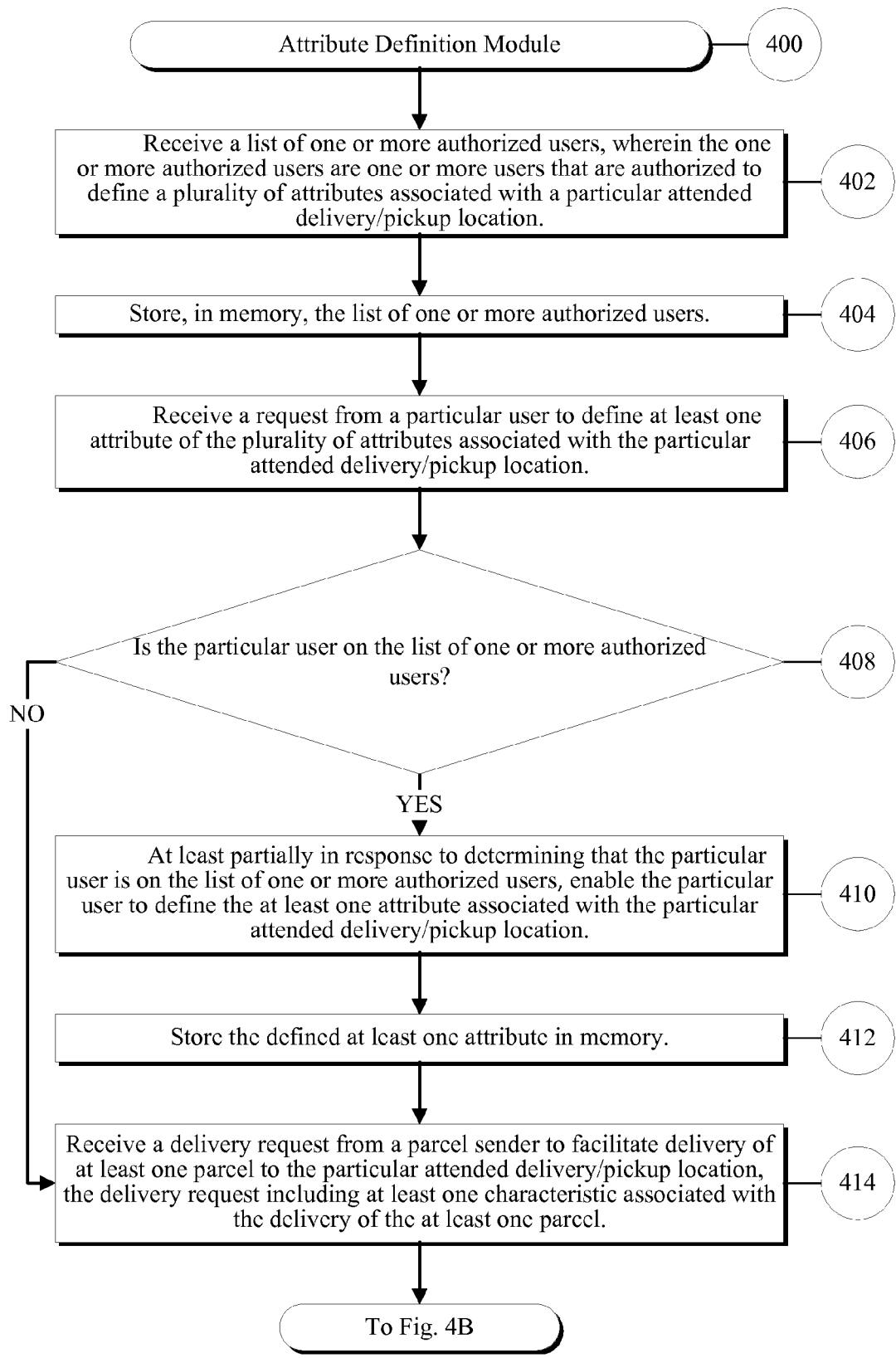
FIGS. 4A and 4B depict flowcharts that generally illustrate various steps executed by an attribute definition module that, for example, may be executed by the logistics server of FIG. 1.
Figure 4B:
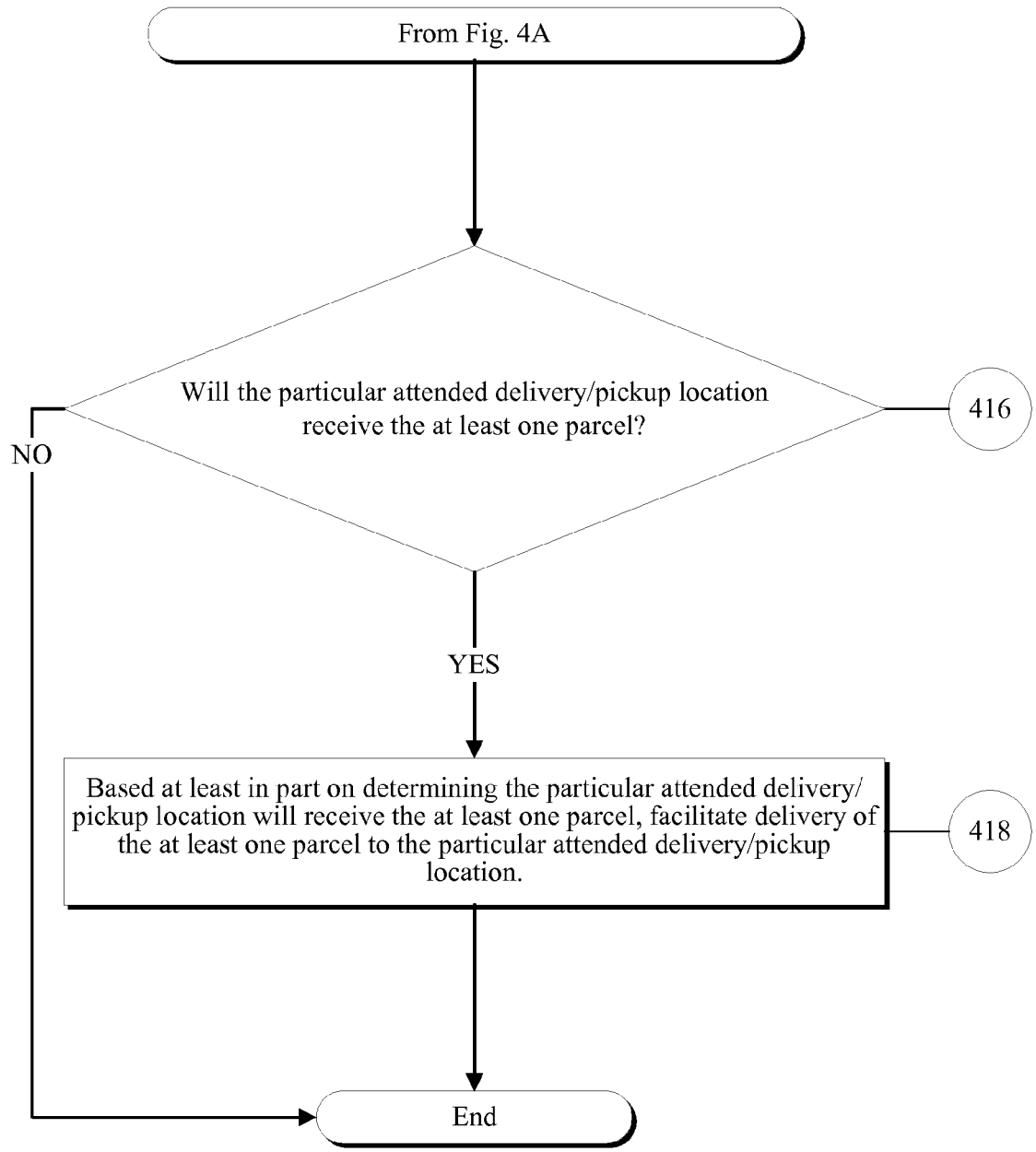

Certain embodiments of the system and method described herein are described in further detail below. As shown in FIGS. 4A and 4B, certain embodiments of the Attribute Definition Module 400 are configured to define attributes of one or more attended delivery/pickup locations. The Attribute Definition Module 400 may operate alone or in combination with the one or more other modules to perform the functions shown in FIGS. 4A and 4B. It should be understood by one skilled in the art that certain embodiments of the Attribute Definition Module 400 may perform the functions shown in FIGS. 4A and 4B in an order other than the order shown in FIGS. 4A and 4B. It should also be understood that various systems, when executing the Attribute Definition Module 400 may omit particular functions or perform additional functions in performing the functions of the Attribute Definition Module 400.

Exemplary Functionality of the Attribute Definition Module

When executing the Attribute Definition Module 400, the system begins, at Step 402, by receiving a list of one or more authorized users, wherein the one or more authorized users are one or more users that are authorized to define a plurality of attributes associated with a particular attended delivery/pickup location. The system may be configured to receive the list of one or more authorized users from any suitable source. In various embodiments, the system is configured to receive the list of one or more authorized users from a client device associated with the particular attended delivery/pickup location (e.g., the list of one or more authorized users is transmitted from one or more servers associated with the particular attended delivery/pickup location). In particular embodiments, the system is configured to receive the list of one or more authorized users from one or more servers associated with a logistics company (e.g., the logistics company has the list of one or more authorized users saved on one or more servers).

The one or more authorized users may be any users. In various embodiments, the one or more authorized users are one or more employees of the particular attended delivery/pickup location. In a particular embodiment, the one or more authorized users are one or more managers of the particular attended delivery/pickup location. In further embodiments, the one or more authorized users are one or more owners of the particular attended delivery/pickup location. In still further embodiments, the one or more authorized users are one or more other representatives of the particular attended delivery/pickup location.

The plurality of attributes associated with the particular attended delivery/pickup location may be any suitable attributes. In various embodiments, the plurality of attributes include one or more attributes that define when the particular delivery/pickup location is open (e.g., doing business). In a particular embodiment, the plurality of attributes may include one or more attributes that define a schedule when the particular attended delivery location will accept a delivery of one or more parcels. For example, if the particular attended delivery/pickup location is a convenience store, the plurality of attributes may include a schedule of which days the convenience store is open and closed for business.

According to particular embodiments, the plurality of attributes include one or more attributes associated with what one or more types of parcels the particular attended delivery/pickup location will accept (or will not accept). In various embodiments, the plurality of attributes include one or more attributes associated with one or more specific brands of products. For example, an authorized user (e.g., a manager) of the particular attended delivery/pickup location (e.g., a convenience store) may define which one or more products the particular attended delivery/pickup location will accept for an individual (e.g., the particular attended delivery/pickup location may define that it only wishes to accept a particular brand of computers).

Each of the plurality of attributes may be expressed in any suitable way. In various embodiments, a particular attribute of the plurality of attributes may be expressed as a time (e.g., where the attribute is an opening or closing time for the particular attended delivery/pickup location). In a particular embodiment, the particular attribute may be expressed as a barcode, product description, brand name, an SKU associated with a particular product, etc. (e.g., where the attribute is associated with one or more products the particular attended delivery/pickup location will accept or will not accept).

At Step 404, the system stores, in memory, the list of one or more authorized users. The system may be configured to store the list of one or more authorized users in any suitable way, including on one or more servers associated with the system and/or on one or more client devices associated with the particular delivery location.

At Step 406, the system receives a request from a particular user to define at least one attribute of the plurality of attributes associated with the particular attended delivery/pickup location. The system may be configured to receive the request from the particular user from any suitable source. In various embodiments, the system is configured to receive the request from a client device associated with the particular delivery/pickup location. In a particular embodiment, the system is configured to receive the request from a client device associated with the particular user (e.g., a mobile computing device associated with the particular user).

The particular user may be any suitable user. In some embodiments, the particular user is an authorized user (e.g., a user on the list of one or more authorized users at Step 402). In various embodiments, the particular user is not specifically an authorized user.

At Step 408, the system determines whether the particular user is on the list of one or more authorized users. The system may be configured to determine whether the particular user is on the list of one or more authorized users in any suitable way. In various embodiments, the system is configured to compare the name of the particular user with names on the list of one or more authorized users (e.g., wherein the list of one or more authorized users includes one or more names of one or more authorized users).

At Step 410, the system, at least partially in response to determining that the particular user is on the list of one or more authorized users, enables the particular user to define the at least one attribute associated with the particular attended delivery/pickup location. The system may be configured to enable the user to define the at least one attribute in any suitable way, including, but not limited to: 1) via a client device associated with the particular user; and/or 2) via one or more client devices associated with the particular attended delivery/pickup location.

At Step 412, the system stores the defined at least one attribute in memory. The system may be configured to store the defined at least one attribute in any suitable way, including on one or more servers associated with the system and/or on one or more client devices associated with the particular delivery location.

At Step 414, the system receives a delivery request to facilitate delivery of at least one parcel to the particular attended delivery/pickup location, the delivery request including at least one characteristic associated with the delivery of the at least one parcel. The system may be configured to receive the delivery request from the parcel sender in any suitable way. In various embodiments, the system is configured to receive the delivery request from the parcel sender via a client device associated with the parcel sender. In one or more embodiments, the system is configured to receive the delivery request from one or more servers associated with a third party (e.g., one or more servers associated with a retailer).

The system may be configured to receive the delivery request from any suitable entity. In various embodiments, the system is configured to receive the delivery request from a particular user that purchased an item contained in the at least one parcel. In particular embodiments, the system is configured to receive the delivery request from a retailer that is shipping the at least one parcel to a particular user (e.g., the user ordered a particular item on a website associated with the retailer and the retailer is shipping the particular item to the user). In one or more embodiments, the system is configured to receive the delivery request from any other suitable representative of the user that purchased the one or more items contained in the at least one parcel.

The system may be configured to receive the delivery request in any suitable form. In various embodiments, the system is configured to receive the request in the form of a shipping request via a webform (e.g., the parcel sender requests to ship the at least one parcel via the webform). In particular embodiments, the system is configured to receive the request to facilitate delivery of the at least one parcel to the particular attended delivery/pickup location via a scan at the particular attended delivery/pickup (e.g., when the at least one parcel arrives, a representative at the attended delivery/pickup location may scan a barcode associated with the at least one parcel).

The delivery request may be a request to facilitate delivery of the at least one parcel in any particular way. In various embodiments, the system is configured to facilitate the delivery of the at least one parcel by scheduling delivery of the at least one parcel to the particular attended delivery/pickup location. In one or more embodiments, the system is configured to facilitate the delivery of the at least one parcel by sending a notification to a client device associated with the particular attended delivery/pickup location (e.g., the system is configured to send a notification to accept the at least one parcel in response to receiving the barcode scan associated with the at least one parcel).

In various embodiments, the delivery request includes at least one characteristic associated with the at least one parcel. In some embodiments is the delivery request includes a description of the one or more items contained in the at least one parcel (e.g., the brand, product, product number, model, etc.). In one or more embodiments, the delivery request includes a barcode, a time of delivery, a SKU number, and/or any other suitable delivery characteristic.

At Step 416, the system determines whether the particular attended delivery/pickup location will receive the at least one parcel based at least in part on: 1) the at least one attribute associated with the particular attended delivery/pickup location; and 2) the at least one characteristic associated with the delivery of the at least one parcel. The system may be configured to determine whether the particular attended delivery/pickup location will receive the at least one parcel in any suitable way. In various embodiments, the system determines whether the particular attended delivery/pickup location will receive the at least one parcel by comparing the at least one attribute associated with the particular attended delivery/pickup location and the at least one characteristic associated with the delivery of the at least one parcel.

In a particular example, the at least one attribute associated with the particular attended delivery/pickup location is one or more brands of products the particular attended delivery/pickup location will not receive and the at least one characteristic associated with the delivery of the at least one parcel is a a brand of product contained in the at least one parcel. Continuing with this particular example, the system compares the one or more brands of products the particular attended delivery/pickup location will not receive and the brand of product contained in the at least one parcel. In this particular example, the system sends a notification to the client device associated with the particular attended delivery/pickup location notifying the particular attended delivery/pickup location to accept the parcel (e.g., the brand of product contained in the at least one parcel is not the one or more brands of products the particular attended delivery/pickup location will not accept).

At Step 418, based at least in part on determining the particular attended delivery/pickup location will receive the at least one parcel, the system facilitates delivery of the at least one parcel to the particular attended delivery/pickup location. The system may facilitate the delivery of the at least one parcel to the particular delivery/pickup location in any suitable way. In a particular embodiment, the system is configured to facilitate the delivery of the at least one parcel to the particular attended delivery/pickup location by notifying a logistics company (e.g., to pickup and deliver the at least one parcel to the particular attended delivery/pickup location). In various embodiments, the system is configured to facilitate the delivery of the at least one parcel to the particular delivery/pickup location by sending a notification to the particular attended delivery/pickup location (e.g., notifying the particular attended delivery location to accept the at least one parcel).

In one or more embodiments, the system is configured to facilitate the delivery of the at least one parcel to the particular delivery/pickup location by sending any other suitable notification (e.g., to the parcel sender and/or to the particular attended delivery/pickup location).

U. Methods for Facilitating Substantially Anonymous Delivery to and Pickup from an Attended Delivery/Pickup Location In particular embodiments, the system is adapted to enable a user to request delivery of one or more items to an attended delivery/pickup location substantially anonymously. As a particular example, a user may order one or more items from an online retailer for delivery to a particular attended delivery/pickup location. In various embodiments, the system may enable the user to complete a transaction with the online retailer for the item as a guest (e.g., without logging into an account associated with the user or the online retailer). The user may then request, as part of the transaction, that the one or more items be delivered to an attended delivery/pickup location. In particular embodiments, the system may be configured to facilitate delivery of the one or more items to the attended delivery/pickup location without associating a name or other identifying characteristic of the user with the one or more items.

The system may, in various embodiments, assign an alias to the user (e.g., such as a unique identifying string of characters, etc.) In other embodiments, the system may be configured to associate a confirmation number with the shipment of the one or more items. In various embodiments, the system may be adapted to require the user to present something other than a proof of identification of the user when the user goes to the attended delivery/pickup location to pick up the one or more items. For example, the system may require the user to present the confirmation number or alias in order to retrieve the one or more items, the system may require the user to show an e-mail, text message, or other suitable confirmation message confirming that the user placed the order for the one or more items, etc. In other embodiments, the system may be configured to require confirmation by a user picking up the one or more items from the attended delivery/pickup location that the user placed the order for the one or more items in any other suitable manner (e.g., a manner in which the user's anonymity is substantially maintained).

V. Systems for Determining Suitability of Locations as Attended Delivery/Pickup Locations In various embodiments, the system is configured to determine a suitability of a particular location to serve as a location for an attended delivery/pickup location. In particular embodiments, the determination is based on, for example: (1) a number of returns that occur at the particular location (e.g., where the particular location is a retail location); (2) a number of complaints about the location (e.g., complaints from customers of a business at the location); (3) geographic and demographic data associated with the particular location; (4) third party commercially available data (e.g., a volume of sales at a business associated with the particular location, an average number of customers that patronize a business associated with the particular location, etc.); and (5) any other suitable factor.

In particular embodiments, determination of suitability for a location as an attended delivery/pickup location is determined using any suitable technique used by retailers or other businesses when selecting a suitable location to open a particular business. In other embodiments, the determination is based at least in part on logistics data (e.g., based at least in part on particular shipping routes utilized by logistics companies, etc.). In other embodiments, the determination may be based on any suitable combination of the factors discussed above, or any other factors.

W. Flexible Activation of Alternative Delivery/Pickup Locations

In various embodiments, the system is adapted to allow a user to quickly activate and/or deactivate one or more attended delivery/pickup locations, and/or to create one or more time-limited attended delivery/pickup locations (e.g., alternative delivery/pickup locations that are set to exist for only a pre-determined amount of time). In a particular embodiment, the system is adapted to allow a user to set up a particular attended delivery/pickup location by: (1) specifying the attended delivery/pickup location; (2) specifying a start time for the attended delivery/pickup location to be in existence; and (3) specifying an end time for the attended delivery/pickup location to be in existence. In various embodiments, the start time is selected to occur at about the beginning of a particular event (e.g., a particular concert, party, sporting event, or other event), and the end time is selected to occur at about the end of the particular event. In particular embodiments, the event may be staffed by one or more individuals associated with the particular event.

X. Regularly Scheduled Pickups

In various embodiments, the system is adapted to coordinate pickups, on a regular basis (e.g., daily, weekly, etc. . . . ) from a particular location. Such pickups may be made by one or more logistics providers that service attended delivery/pickup locations. This service may be implemented for a fee, or for no charge.

In particular embodiments, the system may be adapted to allow individuals to issue a real-time pickup request to have a parcel picked up at a particular location. In particular embodiments, the system may be adapted to automatically select a common carrier from a plurality of common carriers to handle the requested parcel pickup. The system may do this, for example, by: (1) informing a plurality of common carriers of the request; (2) accepting one or more respective bid prices from each of the plurality of common carriers for which the respective common carriers would be willing to handle the requested parcel pickup; (3) based, at least in part, on the respective bid prices, selecting a particular one of the plurality of common carriers to handle the request; and (4) in response to selecting the particular common carrier, facilitating the pickup of the parcel by the particular common carrier.

Y. Automatic Tariff Changes

In various embodiments, the system is adapted to calculate the amount that a particular individual will pay in parcel shipping charges in a way that is customized for the situation at hand. For example, the shipping charge associated with shipping a parcel from a particular on-line retailer to an individual may be based, at least in part, on: (1) the current availability and/or capacity of an attended delivery/pickup location to which the parcel is to be delivered; (2) the frequency of the individual's purchasing and/or shipment activity (e.g., frequent purchasers and/or shippers may receive a discount); (3) the carrier handling the delivery; (4) loyalty to a particular attended delivery/pickup location; (5) loyalty to the carrier handling the delivery; and/or (6) total frequency of shipments to the attended delivery/pickup location on the individual's behalf. In particular embodiments, the system may be customizable by any suitable party (e.g., the owner of an attended delivery/pickup location) or any combination of suitable parties to calculate customized shipping rates based on any combination of any suitable factors, such as the factors listed above.

Z. Exemplary Delivery Configurations

In particular embodiments, the system may be adapted to facilitate the delivery of one or more parcels between various different types of locations. For example, the system may be adapted to facilitate the delivery of one or more parcels from: (1) an attended delivery/pickup location to an individual's home; (2) an attended delivery/pickup location to another attended delivery/pickup location; (3) an individual's home to an attended delivery/pickup location; and (4) a first individual's home to a second individual's home.

Illustrative Example of Delivery to a Suggested Delivery/Pickup Location

Figure 5:
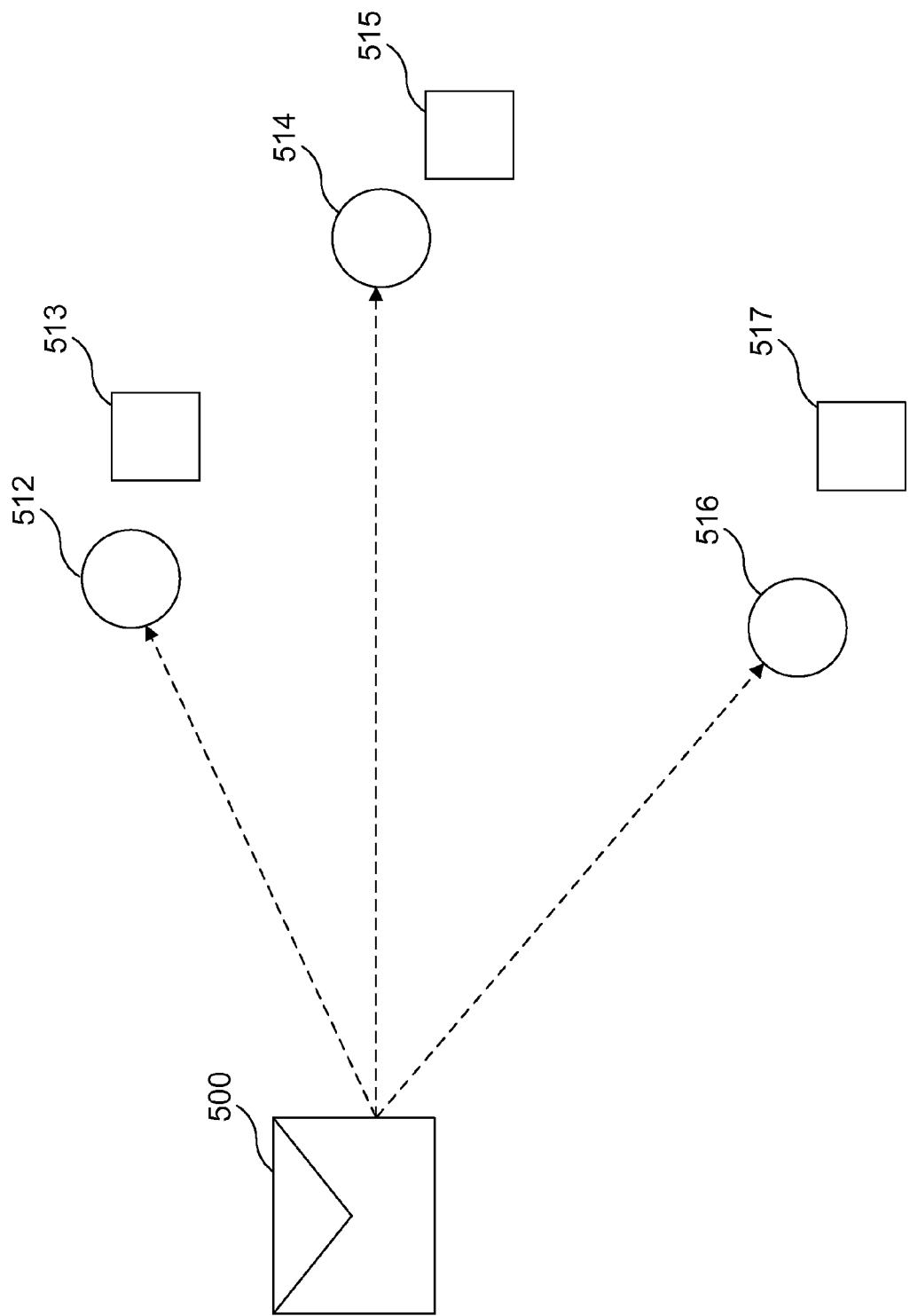
FIG. 5 is a transportation diagram depicting exemplary transportation paths that may be taken by parcels that are delivered to attended delivery/pickup locations according to various embodiments.

FIG. 5 depicts an exemplary transportation diagram that generally illustrates the delivery of a parcel 500 directly to an attended delivery/pickup location 512, 514, 516. As may be understood from this figure, parcel recipients may elect to have parcels delivered directly to attended delivery/pickup locations 512, 514, 516 rather than to other locations that are more closely associated with the parcel recipient (e.g., the parcel recipient's home or workplace). In various embodiments, a system for coordinating the delivery of parcels to attended delivery/pickup locations may provide each potential parcel recipient with a selection of attended delivery/pickup locations from which the parcel recipient may select one or more attended delivery/pickup locations to have their inbound parcels delivered to. For example, the system may present the user with a plurality of attended delivery/pickup locations (e.g., such as delivery/pickup locations 512, 514, 516). These attended delivery/pickup locations may include attended delivery/pickup locations that are located near (e.g., within a particular distance of) one or more locations such as the parcel recipient's home, the parcel recipient's place of work, or any other location that is closely associated with the parcel recipient.

For example, a particular attended delivery/pickup location 512 may be a gas station located half a mile from the user's workplace 513. Another attended delivery/pickup location 514 may be a grocery store three blocks from the user's apartment 515. Yet another attended delivery/pickup location 516 may include a flower shop next door to a gymnasium 517 of which the user is a member. As may be understood from FIG. 5, a common carrier (e.g., or other logistics company) may deliver parcels directly to such attended delivery/pickup locations rather than to the locations that are more closely associated with the parcel recipient 513, 515, 517.

As noted above, delivering to attended delivery/pickup locations rather than particular addresses (e.g., such as home addresses) more closely associated with particular parcel recipient may be beneficial for common carriers in that it may reduce the total number of addresses that the common carrier may need to deliver parcels to in a particular day. This process may also be advantageous to parcel recipients because it may assure that their parcel is delivered to a convenient, attended location. This may, for example, eliminate the risk associated with having the common carrier leave the parcel outside the parcel recipient's home, or with having the parcel misplaced or improperly routed within the parcel recipient's workplace. In particular embodiments, the system is configured to deliver a parcel to whichever attended delivery/pickup location (e.g., attended delivery/pickup location 512, 514, or 516) the user selects.

CONCLUSION

Many modifications and other embodiments of the present systems and methods will come to mind to one skilled in the art to which this present systems and methods pertains having the benefit of the teachings presented in the foregoing descriptions and the associated drawings. While examples discussed above cover the use of the present systems and methods in the context of attended delivery/pickup locations (e.g., attended retail delivery/pickup locations), the present systems and methods may be used in any other suitable context, such as within the context of: 1) unattended delivery/pickup locations; 2) attended delivery-only locations; 3) attended pickup-only location; 4) unattended delivery-only locations; and 5) unattended pickup-only locations. Therefore, it is to be understood that the present systems and methods is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A computer system comprising:
  at least one processor, wherein the computer system is configured for:
  (A) receiving a list of one or more authorized users, wherein the one or more authorized users are one or more users that are authorized to define a plurality of attributes associated with a particular attended delivery/pickup location;
  (B) storing, in memory, the list of one or more authorized users;
  (C) receiving a request from a particular user to define at least one attribute of the plurality of attributes associated with the particular attended delivery/pickup location;
  (D) determining whether the particular user is on the list of one or more authorized users;
  (E) at least partially in response to determining that the particular user is on the list of one or more authorized users, enabling the particular user to define the at least one attribute associated with the particular attended delivery/pickup location;
  (F) storing the defined at least one attribute in memory;
  (G) receiving a delivery request to facilitate delivery of at least one parcel to the particular attended delivery/pickup location, the delivery request comprising at least one characteristic associated with the delivery of the at least one parcel;
  (H) determining whether the particular attended delivery/pickup location will receive the at least one parcel based at least in part on:
    1) the at least one attribute associated with the particular attended delivery/pickup location; and
    2) the at least one characteristic associated with the delivery of the at least one parcel;
  (I) based at least in part on determining that the particular attended delivery/pickup location will receive the at least one parcel, facilitating delivery of the at least one parcel to the particular attended delivery/pickup location; and
  (J) at least partially in response to determining that the particular attended delivery/pickup location will not receive the at least one parcel, rejecting the delivery request, wherein the one or more authorized users comprise one or more users selected from the group consisting of:
    (A) one or more managers of the particular attended delivery/pickup location;
    (B) one or more employees of the particular attended delivery/pickup location; and
    (C) one or more owners of the particular attended delivery/pickup location.

2. The computer system of claim 1, wherein the defined at least one attribute associated with the particular attended delivery/pickup location comprises at least one day the particular attended delivery/pickup location will not be open for parcel delivery.

3. The computer system of claim 2, wherein:
(A) the at least one characteristic associated with the delivery of the at least one parcel comprises a desired parcel delivery time; and
(B) determining the particular attended delivery/pickup location will receive the at least one parcel comprises determining the desired parcel pickup time is not the at least one day the particular attended delivery/pickup location will not be open for parcel delivery.

4. The computer system of claim 3, wherein:
(A) the particular attended delivery/pickup location is open for regular business other than accepting one or more parcels for users; and
(B) the at least one time the particular attended delivery/pickup location will be open for parcel pickup comprises at least one hour the particular attended delivery/pickup location will be open for regular business.

5. The computer system of claim 1, wherein the defined at least one attribute associated with the particular attended delivery/pickup location comprises at least one product description the particular attended delivery/pickup location will accept.

6. The computer system of claim 5, wherein:
(A) the at least one parcel contains at least one product;
(B) the at least one characteristic associated with the delivery of the at least one parcel comprises a product description associated with the at least one product contained in the at least one parcel; and
(C) determining the particular attended delivery/pickup location will receive the at least one parcel comprises determining the product description associated with the at least one product contained in the at least one parcel is the at least one product description the particular attended delivery/pickup location will accept.

7. The computer system of claim 6, wherein:
(A) the defined at least one attribute associated with the particular attended delivery/pickup location comprises at least one SKU number the particular attended delivery/pickup location will accept;
(B) the at least one parcel comprises a SKU number associated with the at least one product contained in the at least one parcel;
(C) the at least one SKU number the particular attended delivery/pickup location will accept comprises at least one SKU number; and
(D) determining whether the particular attended delivery/pickup location will receive the at least one parcel comprises determining the SKU number of the at least one product contained in the at least one parcel is at least partially the at least one SKU number the particular attended delivery/pickup location will accept.

8. The computer system of claim 7, wherein:
(A) the product description associated with the at least one product contained in the at least one parcel comprises a description of a particular brand of computing product; and
(B) the at least one product description the particular attended delivery/pickup location will accept comprises the particular brand of computing product.

9. A non-transitory computer-readable medium storing computer readable instructions for:
(A) receiving at least one defined attribute associated with a particular attended delivery/pickup location;
(B) receiving a list of one or more authorized users, wherein the one or more authorized users are one or more users that are authorized to change the at least one defined attribute associated with the particular attended delivery/pickup location;
(C) storing, in memory, the list of one or more authorized users;
(D) receiving a request from a particular user to change the at least one defined attribute associated with the particular attended delivery/pickup location;
(E) determining whether the particular user is on the list of one or more authorized users;
(F) at least partially in response to determining that the particular user is on the list of one or more authorized users, enabling the particular user to change the at least one defined attribute associated with the particular attended delivery/pickup location;
(G) storing the changed at least one defined attribute in memory;
(H) receiving an acceptance request for the particular attended delivery/pickup location to accept at least one parcel associated with a parcel sender, the acceptance request comprising at least one characteristic associated with the at least one parcel;
(I) determining whether the particular attended delivery/pickup location will accept the at least one parcel based at least in part on:
1) the changed at least one attribute associated with the particular attended delivery/pickup location; and
2) the at least one characteristic associated with the at least one parcel; and
(J) based at least in part on determining the particular attended delivery/pickup location will accept the at least one parcel, facilitating acceptance of the at least one parcel at the particular attended delivery/pickup location, wherein the one or more authorized users comprise one or more users selected from the group consisting of:
(A) one or more managers of the particular attended delivery/pickup location,
(B) one or more employees of the particular attended delivery/pickup location; and
(C) one or more owners of the particular attended delivery/pickup location.

10. The non-transitory computer-readable medium of claim 9, wherein receiving the acceptance request for the particular attended delivery/pickup location to accept the at least one parcel comprises receiving a scan of a barcode associated with the at least one parcel from a client device associated with the particular attended delivery/pickup location.

11. The non-transitory computer-readable medium of claim 10, wherein:
(A) the barcode associated with the at least one parcel comprises at least one product SKU number associated with one or more products contained in the at least one parcel;
(B) the changed at least one attribute associated with the particular attended delivery/pickup location comprises an acceptance SKU; and
(C) determining whether the particular attended delivery/pickup location will accept the at least one parcel comprises determining that the product SKU is substantially equivalent to the acceptance SKU.

12. The non-transitory computer-readable medium of claim 10, wherein facilitating acceptance of the at least one parcel at the particular attended delivery/pickup location comprises sending a notification indicating acceptance of the at least one parcel to the client device associated with the particular attended delivery/pickup location.

13. The non-transitory computer-readable medium of claim 9, wherein the list of one or more authorized users comprises one or more managers of the particular attended delivery/pickup location.

14. The non-transitory computer-readable medium of claim 13, wherein the defined at least one attribute associated with the particular attended delivery/pickup location comprises at least one time the particular attended delivery/pickup location will be open for parcel pickup.

15. The non-transitory computer-readable medium of claim 14, wherein:
   (A) the at least one characteristic associated with the delivery of the at least one parcel comprises a desired parcel pickup time; and
   (B) determining the particular attended delivery/pickup location will receive the at least one parcel comprises determining the desired parcel pickup time is about the at least one time the particular attended delivery/pickup location will be open for parcel pickup.

16. The non-transitory computer-readable medium of claim 15, wherein:
   (A) the particular attended delivery/pickup location is open for regular business other than accepting one or more parcels for users; and
   (B) the at least one time the particular attended delivery/pickup location will be open for parcel pickup comprises at least one hour the particular attended delivery/pickup location will be open for regular business.

17. A computer-implemented method, by at least one processor, comprising:
   (A) receiving:
      i) a defined time attribute associated with a particular attended delivery/pickup location, the defined time attribute comprising at least one time the particular attended delivery/pickup location will accept one or more parcels; and
      ii) a defined product attribute associated with the particular attended delivery/pickup location, the defined product attribute comprising one or more products the particular attended delivery/pickup location will accept;
   (B) receiving a list of one or more authorized users, wherein the one or more authorized users are one or more users that are authorized to change:
      i) the defined time attribute associated with the particular attended delivery/pickup location; and
      ii) the defined product attribute associated with the particular attended delivery/pickup location;
   (C) storing, in memory, the list of one or more authorized users;
   (D) receiving a request from a particular user to change the defined time attribute;
   (E) determining whether the particular user is on the list of one or more authorized users;
   (F) at least partially in response to determining that the particular user is on the list of one or more authorized users, enabling the particular user to change the defined time attribute associated with the particular attended delivery/pickup location;
   (G) storing the changed defined time attribute in memory;
   (H) receiving an acceptance request for the particular attended delivery/pickup location to accept at least one parcel associated with a parcel sender; the acceptance request comprising at least one characteristic associated with the at least one parcel;
   (I) determining whether the particular attended delivery/pickup location will accept the at least one parcel based at least in part on:
      1) the defined time attribute associated with the particular attended delivery/pickup location; and
      2) the at least one characteristic associated with the at least one parcel; and
   (J) based at least in part on determining the particular attended delivery/pickup location will accept the at least one parcel, facilitating acceptance of the at least one parcel at the particular attended delivery/pickup location, wherein the one or more authorized users comprise one or more users selected from a group consisting of:
   (A) one or more managers of the particular attended delivery/pickup location;
   (B) one or more employees of the particular attended delivery/pickup location; and
   (C) one or more owners of the particular attended delivery/pickup location.

18. The computer-implemented method of claim 17, wherein determining whether the particular attended delivery/pickup location will accept the at least one parcel is further based at least in part on the defined product attribute.

19. The computer-implemented method of claim 18, wherein:
   the defined product attribute comprises one or more specific brands of product; and
   the at least one characteristic associated with the at least one parcel comprises at least one product brand associated with the at least one product contained in the at least one parcel.

20. A computer system comprising:
   at least one processor, wherein the computer system is configured for:
   (A) storing a list of at least one particular product brand of products that a particular attended delivery/pickup location will not accept;
   (B) receiving a delivery request to facilitate delivery of at least one parcel to the particular attended delivery/pickup location;
   (C) receiving at least one characteristic associated with at least one product contained in the at least one parcel;
   (D) determining, based at least in part on the characteristic, whether the at least one product includes one or more products of the at least one particular product brand that the particular attended delivery/pickup location will not accept;
   (E) at least partially in response to determining that the at least one product does not include one or more products of the at least one particular brand, facilitating delivery of the at least one parcel to the particular attended delivery/pickup location; and
   (F) at least partially in response to determining that the at least one product includes one or more products of the at least one particular brand, rejecting the delivery request.

21. The computer system of claim 20, wherein the computer system is further configured for:
   enabling one or more users to define at least one particular product brand that the particular attended delivery/pickup location will not accept.

22. The computer system of claim 21, wherein the computer system is further configured for:
- receiving a list of one or more authorized users, wherein the one or more authorized users are one or more users that are authorized to define the at least one particular product brand that the particular attended delivery/pickup location will not accept;
- storing, in memory, the list of one or more authorized users;
- receiving a request from a particular user to define the at least one particular product brand that the particular attended delivery/pickup location will not accept;
- determining whether the particular user is on the list of one or more authorized users; and
- at least partially in response to determining that the particular user is on the list of one or more authorized users, enabling the particular user to define the at least one particular product brand that the particular attended delivery/pickup location will not accept.

23. The computer system of claim 22, wherein the one or more authorized users comprise one or more users selected from the group consisting of:
- (A) one or more managers of the particular attended delivery/pickup location;
- (B) one or more employees of the particular attended delivery/pickup location; and
- (C) one or more owners of the particular attended delivery/pickup location.

24. A computer system comprising:
- at least one processor, wherein the computer system is configured for:
- (A) storing a list of at least one particular product that a particular attended delivery/pickup location will not accept;
- (B) receiving a delivery request to facilitate delivery of at least one parcel to the particular attended delivery/pickup location;
- (C) receiving at least one characteristic associated with at least one product contained in the at least one parcel;
- (D) determining, based at least in part on the characteristic, whether the at least one product includes the at least one particular product that the particular attended delivery/pickup location will not accept;
- (E) at least partially in response to determining that the at least one product does not include the at least one particular product, facilitating delivery of the at least one parcel to the particular attended delivery/pickup location; and
- (F) at least partially in response to determining that the at least one product includes the at least one particular product, rejecting the delivery request.

25. The computer system of claim 24, wherein the list of at least one particular product that the particular attended delivery/pickup location will not accept comprises at least one SKU associated with the at least one particular product.

26. The computer system of claim 24, wherein the computer system is further configured for:
- enabling one or more users to define the at least one particular product that the particular attended delivery/pickup location will not accept.

27. The computer system of claim 26, wherein the computer system is further configured for:
- receiving a list of one or more authorized users, wherein the one or more authorized users are one or more users that are authorized to define the at least one particular product that the particular attended delivery/pickup location will not accept;
- storing, in memory, the list of one or more authorized users;
- receiving a request from a particular user to define the at least one particular product that the particular attended delivery/pickup location will not accept;
- determining whether the particular user is on the list of one or more authorized users; and
- at least partially in response to determining that the particular user is on the list of one or more authorized users, enabling the particular user to define the at least one particular product that the particular attended delivery/pickup location will not accept.

28. The computer system of claim 27, wherein the one or more authorized users comprise one or more users selected from the group consisting of:
- (A) one or more managers of the particular attended delivery/pickup location;
- (B) one or more employees of the particular attended delivery/pickup location; and
- (C) one or more owners of the particular attended delivery/pickup location.

* * * * *